United States Patent
Koenig et al.

(10) Patent No.: US 11,772,601 B2
(45) Date of Patent: Oct. 3, 2023

(54) VEHICLE SECURITY SYSTEM

(71) Applicant: Polaris Industries Inc., Medina, MN (US)

(72) Inventors: David J. Koenig, Wyoming, MN (US); Joseph D. Tharaldson, Roseau, MN (US); Nathan J. Secor, Plymouth, MN (US)

(73) Assignee: Polaris Industries Inc., Medina, MN (US)

( * ) Notice: Subject to any disclaimer, the term of this patent is extended or adjusted under 35 U.S.C. 154(b) by 156 days.

(21) Appl. No.: 17/011,726

(22) Filed: Sep. 3, 2020

(65) Prior Publication Data

US 2020/0398785 A1      Dec. 24, 2020

Related U.S. Application Data

(60) Division of application No. 14/667,172, filed on Mar. 24, 2015, now Pat. No. 10,773,684, which is a
(Continued)

(51) Int. Cl.
*B60R 25/04* (2013.01)
*B60K 28/00* (2006.01)
(Continued)

(52) U.S. Cl.
CPC .............. *B60R 25/04* (2013.01); *B60K 28/00* (2013.01); *B60R 25/00* (2013.01); *B60R 25/102* (2013.01);
(Continued)

(58) Field of Classification Search
CPC ... B60K 28/00; B60R 2025/041; B60R 25/00; B60R 25/04; B60R 25/102; B60R 25/23;
(Continued)

(56) References Cited

U.S. PATENT DOCUMENTS 2,834,608 A   5/1958  Wixson
2,938,601 A   5/1960  Brafford
(Continued)

FOREIGN PATENT DOCUMENTS

CA   1150752 A    7/1983
CA   2561337 A1   9/1999
(Continued)

OTHER PUBLICATIONS

"TrakMaps—Our Digital Maps & Charts," Jan. 28, 2013, XP055134443, retrieved from the Internet: URL:https://web.arvhive.org/web/20130128163 653/http://www.trakmaps.com/ListGPSProducts.aspx?p=s [retrieved on Aug. 12, 2014]; 1 page.
(Continued)

*Primary Examiner* — Yong Hang Jiang
(74) *Attorney, Agent, or Firm* — Faegre Drinker Biddle & Reath LLP

(57) ABSTRACT

A vehicle is disclosed which includes a controller having at least one of a vehicle security module and a playback module. The vehicle security module may operate in a secure once mode of operation or in a secure all mode of operation. The playback module records ride information associated with the vehicle. The ride information may be provided to an external device.

40 Claims, 24 Drawing Sheets

Related U.S. Application Data continuation of application No. 12/475,531, filed on May 31, 2009, now Pat. No. 8,994,494.

(60) Provisional application No. 61/104,436, filed on Oct. 10, 2008.

(51) Int. Cl.
*B60R 25/00* (2013.01)
*B62M 27/02* (2006.01)
*B60R 25/102* (2013.01)
*B60R 25/23* (2013.01)
*B60R 25/30* (2013.01)
*B60R 25/34* (2013.01)

(52) U.S. Cl.
CPC ............ *B60R 25/23* (2013.01); *B60R 25/302* (2013.01); *B60R 25/34* (2013.01); *B62M 27/02* (2013.01); *B60R 2025/041* (2013.01); *B62M 2027/026* (2013.01); *Y10T 29/4997* (2015.01); *Y10T 403/473* (2015.01)

(58) Field of Classification Search
CPC .................. B60R 25/302; B60R 25/34; B62M 2027/026; B62M 27/02; Y10T 29/4997; Y10T 403/473
See application file for complete search history.

(56) References Cited

U.S. PATENT DOCUMENTS

| | | |
|---|---|---|
| RE26,775 E | 1/1970 | Smieja |
| 3,688,856 A | 9/1972 | Boehm et al. |
| 3,712,416 A | 1/1973 | Swanson et al. |
| 3,767,223 A | 10/1973 | Bottenberg |
| 3,784,839 A | 1/1974 | Weber |
| 3,786,897 A | 1/1974 | Swanson |
| 3,791,482 A | 2/1974 | Sykora |
| 3,800,910 A | 4/1974 | Rose |
| 3,840,082 A | 10/1974 | Olson |
| 3,840,083 A | 10/1974 | Woods |
| 3,933,213 A | 1/1976 | Trowbridge |
| 3,966,014 A | 6/1976 | Gowing |
| 3,969,895 A | 7/1976 | Krizman |
| RE28,922 E | 8/1976 | Lloyd, III |
| 3,977,493 A | 8/1976 | Richardson |
| 3,987,408 A | 10/1976 | Sassover et al. |
| 4,046,219 A | 9/1977 | Shaikh |
| 4,109,751 A | 8/1978 | Kabele |
| 4,136,756 A | 1/1979 | Kawamura |
| 4,222,453 A | 9/1980 | Fixsen et al. |
| 4,254,746 A | 3/1981 | Chiba et al. |
| 4,339,156 A | 7/1982 | Livesay |
| 4,407,386 A | 10/1983 | Yasui et al. |
| 4,442,913 A | 4/1984 | Grinde |
| 4,532,507 A | 7/1985 | Edson et al. |
| 4,561,670 A | 12/1985 | Takada |
| 4,585,247 A | 4/1986 | Takada |
| 4,592,316 A | 6/1986 | Shiratsuchi et al. |
| 4,675,865 A | 6/1987 | DeVries et al. |
| 4,682,062 A | 7/1987 | Weinberger |
| 4,696,148 A | 9/1987 | Brace |
| 4,715,031 A | 12/1987 | Crawford et al. |
| 4,745,596 A | 5/1988 | Sato |
| 4,754,255 A * | 6/1988 | Sanders .................. B60R 25/23 340/5.31 |
| 4,782,912 A | 11/1988 | Wandless |
| 4,858,722 A | 8/1989 | Abbe et al. |
| 4,896,991 A | 1/1990 | Yasuhara |
| 4,900,049 A | 2/1990 | Tseng |
| 4,917,207 A | 4/1990 | Yasui et al. |
| 4,987,965 A | 1/1991 | Bourret |
| 4,991,683 A | 2/1991 | Garretto et al. |
| 5,016,728 A | 5/1991 | Zulawski |
| 5,023,591 A | 6/1991 | Edwards |
| 5,038,582 A | 8/1991 | Takamatsu |
| 5,040,168 A | 8/1991 | Maue et al. |
| 5,052,848 A | 10/1991 | Nakamura |
| 5,060,745 A | 10/1991 | Yasui et al. |
| 5,070,832 A | 12/1991 | Hapka et al. |
| 5,081,586 A | 1/1992 | Barthel et al. |
| 5,152,365 A | 10/1992 | Aoshima |
| 5,168,957 A | 12/1992 | Ross |
| 5,191,531 A | 3/1993 | Kurosu et al. |
| 5,251,718 A | 10/1993 | Inagawa et al. |
| 5,311,514 A | 5/1994 | Cook |
| 5,370,198 A | 12/1994 | Karpik |
| 5,404,630 A | 4/1995 | Wu |
| 5,418,526 A | 5/1995 | Crawford |
| 5,491,631 A | 2/1996 | Shirane et al. |
| 5,513,107 A | 4/1996 | Gormley |
| 5,529,544 A | 6/1996 | Berto |
| 5,613,794 A | 3/1997 | Isaac et al. |
| 5,660,245 A | 8/1997 | Marier et al. |
| 5,665,187 A | 9/1997 | Mackellar |
| 5,667,031 A | 9/1997 | Karpik |
| 5,692,759 A | 12/1997 | Flynn |
| 5,697,332 A | 12/1997 | Asai et al. |
| 5,708,238 A | 1/1998 | Asao et al. |
| 5,727,643 A | 3/1998 | Kawano et al. |
| 5,742,226 A | 4/1998 | Szabo et al. |
| 5,745,241 A | 4/1998 | Hashimoto |
| 5,767,771 A | 6/1998 | Lamont |
| 5,769,051 A | 6/1998 | Bayron et al. |
| 5,769,442 A | 6/1998 | Robinson et al. |
| 5,803,043 A | 9/1998 | Bayron et al. |
| 5,856,976 A | 1/1999 | Hirano |
| 5,857,385 A | 1/1999 | Takeuchi |
| 5,860,486 A | 1/1999 | Boivin et al. |
| 5,861,816 A * | 1/1999 | Funakoshi ............... B60R 25/04 235/382 |
| 5,862,662 A | 1/1999 | Fukuda et al. |
| 5,869,907 A | 2/1999 | Marler |
| 5,944,133 A | 8/1999 | Eto |
| 5,947,217 A | 9/1999 | Snare et al. |
| 5,957,230 A | 9/1999 | Harano et al. |
| 5,992,552 A | 11/1999 | Eto |
| 6,060,981 A * | 5/2000 | Landes ................... B60R 25/04 340/426.12 |
| 6,154,132 A | 11/2000 | Iwamoto et al. |
| 6,161,908 A | 12/2000 | Takayama et al. |
| 6,216,809 B1 | 4/2001 | Etou et al. |
| 6,227,323 B1 | 5/2001 | Ashida |
| 6,247,442 B1 | 6/2001 | Bedard et al. |
| 6,249,727 B1 | 6/2001 | Muller |
| 6,275,231 B1 | 8/2001 | Obradovich |
| 6,278,941 B1 | 8/2001 | Yokoyama |
| 6,321,864 B1 | 11/2001 | Forbes |
| 6,339,745 B1 | 1/2002 | Novik |
| 6,343,578 B1 | 2/2002 | Kerkau et al. |
| 6,356,186 B1 | 3/2002 | Price et al. |
| 6,356,189 B1 | 3/2002 | Fujimaki |
| 6,378,645 B1 | 4/2002 | Uegane et al. |
| 6,379,411 B1 | 4/2002 | Turner et al. |
| 6,390,219 B1 | 5/2002 | Vaisanen |
| 6,390,869 B2 | 5/2002 | Korenjak et al. |
| 6,411,217 B1 * | 6/2002 | Gabbard ................. G08C 23/04 340/5.1 |
| 6,415,747 B1 | 7/2002 | Asano et al. |
| 6,415,759 B2 | 7/2002 | Ohrnberger et al. |
| 6,430,488 B1 | 8/2002 | Goldman et al. |
| 6,461,208 B2 | 10/2002 | Suzuki et al. |
| 6,470,256 B1 * | 10/2002 | Cikalo ................... B60K 31/04 701/93 |
| 6,491,125 B2 | 12/2002 | Girouard et al. |
| 6,520,284 B2 | 2/2003 | Spannbauer et al. |
| 6,544,086 B2 | 4/2003 | Tscherne et al. |
| 6,551,385 B2 | 4/2003 | Turner et al. |
| 6,554,665 B1 | 4/2003 | Kaneko |
| 6,556,905 B1 | 4/2003 | Mittelsteadt et al. |
| RE38,124 E | 5/2003 | Mallette et al. |
| 6,557,530 B1 | 5/2003 | Benson et al. |
| 6,568,030 B1 | 5/2003 | Watanabe et al. |

(56) References Cited

U.S. PATENT DOCUMENTS

| | | |
|---|---|---|
| 6,568,376 B2 | 5/2003 | Sonnleitner et al. |
| 6,591,819 B2 | 7/2003 | Tscherne et al. |
| 6,595,309 B1 | 7/2003 | Savage et al. |
| 6,595,811 B2 | 7/2003 | Dagenais et al. |
| 6,601,528 B2 | 8/2003 | Bilek et al. |
| D479,813 S | 9/2003 | Cadotte et al. |
| 6,626,140 B2 | 9/2003 | Aichinger et al. |
| 6,626,258 B1 | 9/2003 | Forbes |
| 6,695,083 B2 | 2/2004 | Nakamura et al. |
| 6,697,966 B1 | 2/2004 | Smuk et al. |
| 6,715,460 B2 | 4/2004 | Ashida et al. |
| 6,725,958 B2 | 4/2004 | Ashida et al. |
| 6,744,985 B1 | 6/2004 | Smuk et al. |
| 6,745,862 B2 | 6/2004 | Morii et al. |
| 6,755,271 B1 | 6/2004 | Berg |
| 6,756,697 B2 | 6/2004 | Mizutani et al. |
| 6,761,241 B2 | 7/2004 | Kohda |
| 6,772,061 B1 | 8/2004 | Berthiaume et al. |
| 6,784,569 B1 | 8/2004 | Peller |
| D495,973 S | 9/2004 | Cadotte et al. |
| 6,796,395 B1 | 9/2004 | Berg et al. |
| 6,806,590 B1 | 10/2004 | Smuk et al. |
| 6,823,834 B2 | 11/2004 | Benson et al. |
| 6,823,957 B2 | 11/2004 | Girouard et al. |
| 6,856,820 B1 | 2/2005 | Kolls |
| 6,871,250 B2 | 3/2005 | Froeschl et al. |
| 6,898,656 B2 | 5/2005 | Griessbach et al. |
| D505,889 S | 6/2005 | Girouard et al. |
| 6,926,108 B1 | 8/2005 | Polakowski et al. |
| 6,941,924 B2 | 9/2005 | Morii et al. |
| 6,942,050 B1 | 9/2005 | Honkala et al. |
| 6,987,446 B2 | 1/2006 | Konno et al. |
| 7,004,137 B2 | 2/2006 | Kunugi et al. |
| 7,014,004 B2 | 3/2006 | Etou |
| 7,040,437 B1 | 5/2006 | Fredrickson et al. |
| 7,044,814 B2 | 5/2006 | Kamio et al. |
| 7,047,924 B1 | 5/2006 | Waters et al. |
| 7,055,454 B1 | 6/2006 | Whiting et al. |
| 7,063,057 B1 | 6/2006 | Waters et al. |
| 7,159,557 B2 | 1/2007 | Yasuda et al. |
| 7,182,165 B1 | 2/2007 | Keinath et al. |
| 7,213,669 B2 | 5/2007 | Fecteau et al. |
| 7,222,006 B2 | 5/2007 | Proefke et al. |
| 7,227,283 B2 | 6/2007 | Suzuki |
| 7,237,803 B2 | 7/2007 | Nguyen |
| 7,249,652 B2 | 7/2007 | Wolf |
| 7,275,512 B2 | 10/2007 | Deiss et al. |
| 7,357,207 B2 | 4/2008 | Vaeisaenen |
| 7,394,352 B2 | 7/2008 | Bell et al. |
| D576,522 S | 9/2008 | Longpre et al. |
| 7,444,236 B2 | 10/2008 | Wiles |
| 7,455,141 B2 | 11/2008 | Hildebrand |
| 7,458,354 B1 | 12/2008 | Phaneuf et al. |
| 7,523,951 B2 | 4/2009 | Kinouchi et al. |
| 7,533,749 B1 | 5/2009 | Sampson et al. |
| 7,578,366 B2 | 8/2009 | Moji |
| D601,453 S | 10/2009 | Brew et al. |
| 7,753,154 B2 | 7/2010 | Maltais |
| 7,761,217 B2 | 7/2010 | Waters et al. |
| 7,802,646 B2 | 9/2010 | Matsudo |
| 7,854,285 B1 | 12/2010 | Giese |
| 7,854,290 B1 | 12/2010 | McKoskey |
| 8,060,400 B2 | 11/2011 | Wellman |
| 8,127,877 B2 | 3/2012 | Fredrickson et al. |
| 8,225,896 B2 | 7/2012 | Eichenberger et al. |
| 8,280,595 B2 | 10/2012 | Foster et al. |
| 8,490,731 B2 | 7/2013 | Eaton et al. |
| 8,590,654 B2 | 11/2013 | Kerner et al. |
| 8,602,159 B2 | 12/2013 | Harris et al. |
| 8,610,550 B2 | 12/2013 | Hagiwara et al. |
| 8,613,335 B2 | 12/2013 | Deckard et al. |
| 8,620,515 B2 | 12/2013 | Kwak |
| 8,651,800 B2 | 2/2014 | Li |
| 8,746,719 B2 | 6/2014 | Safranski et al. |
| 8,893,835 B2 | 11/2014 | Nam et al. |
| 8,994,494 B2 | 3/2015 | Koenig et al. |
| 9,174,702 B1 | 11/2015 | Gauthier et al. |
| 9,809,195 B2 | 11/2017 | Giese et al. |
| 2001/0044677 A1 | 11/2001 | Bauer et al. |
| 2002/0023792 A1 | 2/2002 | Bouffard et al. |
| 2002/0027029 A1 | 3/2002 | Yatagai et al. |
| 2002/0042670 A1 | 4/2002 | Diaz et al. |
| 2002/0053477 A1 | 5/2002 | Karpik |
| 2002/0059075 A1 | 5/2002 | Schick et al. |
| 2002/0112909 A1 | 8/2002 | Nishijima |
| 2002/0171291 A1 | 11/2002 | Wayne et al. |
| 2002/0179356 A1 | 12/2002 | Morii et al. |
| 2002/0188425 A1 | 12/2002 | Nakagawa et al. |
| 2003/0029659 A1 | 2/2003 | Etou |
| 2003/0047368 A1 | 3/2003 | Morin et al. |
| 2003/0070020 A1 | 4/2003 | Kondo et al. |
| 2003/0070854 A1 | 4/2003 | Bergman |
| 2003/0097211 A1 | 5/2003 | Carroll et al. |
| 2003/0105567 A1 | 6/2003 | Koenig et al. |
| 2003/0150658 A1 | 8/2003 | Nakano et al. |
| 2003/0154009 A1* | 8/2003 | Basir .................. G07C 5/0866 348/148 |
| 2003/0172907 A1 | 9/2003 | Nytomt et al. |
| 2003/0183436 A1 | 10/2003 | Karpik |
| 2004/0003153 A1 | 1/2004 | Froeschl et al. |
| 2004/0011096 A1 | 1/2004 | Quinn et al. |
| 2004/0015603 A1 | 1/2004 | Griessbach et al. |
| 2004/0016583 A1 | 1/2004 | Pyykonen |
| 2004/0021286 A1 | 2/2004 | Bombardier et al. |
| 2004/0048598 A1 | 3/2004 | Gagnon |
| 2004/0089492 A1 | 5/2004 | Eide |
| 2004/0164850 A1 | 8/2004 | Konno et al. |
| 2004/0173991 A1 | 9/2004 | Watterton et al. |
| 2004/0186929 A1 | 9/2004 | Salerno |
| 2004/0187826 A1 | 9/2004 | Kino et al. |
| 2004/0188159 A1 | 9/2004 | Yatagai et al. |
| 2004/0211608 A1 | 10/2004 | Morin et al. |
| 2004/0215861 A1 | 10/2004 | Beaudoin et al. |
| 2004/0225557 A1 | 11/2004 | Phelan et al. |
| 2004/0254690 A1 | 12/2004 | Hasegawa et al. |
| 2004/0262064 A1 | 12/2004 | Lefort |
| 2005/0014606 A1 | 1/2005 | Duty et al. |
| 2005/0060417 A1 | 3/2005 | Rose |
| 2005/0067220 A1 | 3/2005 | Keller et al. |
| 2005/0115754 A1 | 6/2005 | Watson et al. |
| 2005/0125565 A1 | 6/2005 | Ying |
| 2005/0161283 A1 | 7/2005 | Emler |
| 2005/0190039 A1* | 9/2005 | Aoyama ............ G07C 9/00182 340/5.21 |
| 2005/0190080 A1 | 9/2005 | Flick |
| 2005/0199432 A1 | 9/2005 | Abe et al. |
| 2005/0199433 A1 | 9/2005 | Abe et al. |
| 2005/0205320 A1 | 9/2005 | Girouard et al. |
| 2005/0225067 A1 | 10/2005 | Nguyen |
| 2005/0252592 A1 | 11/2005 | Albright et al. |
| 2005/0252705 A1 | 11/2005 | Abe et al. |
| 2005/0279552 A1 | 12/2005 | Schuehmacher et al. |
| 2006/0032700 A1 | 2/2006 | Vizanko |
| 2006/0060174 A1 | 3/2006 | Ashida |
| 2006/0064223 A1 | 3/2006 | Voss |
| 2006/0085966 A1 | 4/2006 | Kerner et al. |
| 2006/0180370 A1 | 8/2006 | Polakowski et al. |
| 2006/0191728 A1 | 8/2006 | Aoshima |
| 2006/0212195 A1 | 9/2006 | Veith et al. |
| 2006/0226961 A1 | 10/2006 | Bell et al. |
| 2006/0232131 A1 | 10/2006 | Endo |
| 2006/0236980 A1 | 10/2006 | Maruo et al. |
| 2006/0265117 A1 | 11/2006 | Cahoon |
| 2007/0017480 A1 | 1/2007 | Kondo |
| 2007/0028877 A1 | 2/2007 | McDonald et al. |
| 2007/0034435 A1 | 2/2007 | Berg et al. |
| 2007/0050095 A1 | 3/2007 | Nelson et al. |
| 2007/0062751 A1 | 3/2007 | Rasidescu et al. |
| 2007/0119650 A1 | 5/2007 | Eide |
| 2007/0199753 A1 | 8/2007 | Giese et al. |
| 2007/0200663 A1* | 8/2007 | White .................. B60R 25/255 340/5.31 |
| 2007/0221424 A1 | 9/2007 | Giese |
| 2007/0222293 A1 | 9/2007 | Shimomura |

(56) References Cited

U.S. PATENT DOCUMENTS

| | | | |
|---|---|---|---|
| 2007/0227810 A1 | 10/2007 | Sakurai et al. |
| 2007/0246283 A1 | 10/2007 | Giese et al. |
| 2008/0023262 A1 | 1/2008 | Hayashi et al. |
| 2008/0041335 A1 | 2/2008 | Buchwitz et al. |
| 2008/0141957 A1 | 6/2008 | Dea et al. |
| 2008/0185202 A1 | 8/2008 | Maltais |
| 2009/0143937 A1 | 6/2009 | Craig |
| 2009/0217908 A1 | 9/2009 | Watanabe et al. |
| 2009/0294197 A1 | 12/2009 | Polakowski et al. |
| 2009/0302590 A1 | 12/2009 | Van et al. |
| 2010/0071982 A1 | 3/2010 | Giese et al. |
| 2010/0108427 A1 | 5/2010 | Richer |
| 2010/0170231 A1 | 7/2010 | Yamaguchi |
| 2010/0269771 A1 | 10/2010 | Wermuth et al. |
| 2011/0060480 A1 | 3/2011 | Mottla et al. |
| 2011/0088968 A1 | 4/2011 | Kempf et al. |
| 2011/0093165 A1 | 4/2011 | Miller et al. |
| 2011/0100340 A1 | 5/2011 | Mukkala et al. |
| 2011/0139529 A1 | 6/2011 | Eichenberger et al. |
| 2012/0143465 A1 | 6/2012 | Kim |
| 2012/0205902 A1 | 8/2012 | Beavis et al. |
| 2013/0110739 A1 | 5/2013 | Hill et al. |
| 2013/0125535 A1 | 5/2013 | Schultz |
| 2013/0180798 A1 | 7/2013 | Matsushima et al. |
| 2013/0226633 A1 | 8/2013 | Brock et al. |
| 2013/0231798 A1 | 9/2013 | Zurawski et al. |
| 2013/0233265 A1 | 9/2013 | Zurface et al. |
| 2013/0246102 A1 | 9/2013 | Finegold et al. |
| 2015/0197215 A1 | 7/2015 | Koenig et al. |

FOREIGN PATENT DOCUMENTS

| | | | |
|---|---|---|---|
| CA | 2168905 C | 11/2003 | |
| CN | 1661349 A | 8/2005 | |
| DE | 4326328 A1 | 11/1994 | |
| DE | 4431070 A1 | 3/1996 | |
| EP | 0287038 A2 | 10/1988 | |
| EP | 0323543 A1 | 7/1989 | |
| EP | 0723892 A2 | 7/1996 | |
| EP | 0978433 A2 | 2/2000 | |
| EP | 1712772 A2 | 10/2006 | |
| FR | 2307974 A1 | 11/1976 | |
| FR | 2549795 A1 | 2/1985 | |
| FR | 2909955 A1 * | 6/2008 | ............ B60R 25/04 |
| GB | 2232272 A | 12/1990 | |
| GB | 2387155 A | 10/2003 | |
| JP | 01-113527 A | 5/1989 | |
| JP | 2001-065344 A | 3/2001 | |
| WO | 95/01503 A1 | 1/1995 | |
| WO | 01/05613 A1 | 1/2001 | |
| WO | 02/87957 A1 | 11/2002 | |
| WO | 2004/031567 A1 | 4/2004 | |
| WO | 2006/110805 A2 | 10/2006 | |
| WO | 2007/100751 A2 | 9/2007 | |
| WO | 2008/060265 A2 | 5/2008 | |
| WO | 2009/014861 A1 | 1/2009 | |
| WO | 2009/114414 A1 | 9/2009 | |
| WO | 2011/093847 A1 | 8/2011 | |
| WO | 2011/099959 A1 | 8/2011 | |
| WO | 2013/137182 A1 | 9/2013 | |

OTHER PUBLICATIONS

2004 Engine Preview—Volvo Penta; www.powerandmotoryacht.com/engines/0104preview/index.html; printed Jun. 30, 2005, 2 pgs.
Annex to Form PCT/ISA/206 Communication Relating to the Results of the Partial International Search issued by the European Patent Office, dated Mar. 2, 2010, Rijswijk, Netherlands, for a related international PCT Application No. PCT/US2009/066093; 6 pages.
Applicants' Response to the European Examination Report filed Jun. 25, 2012 for related European Application No. 09 720 174.3; 13 pages.
Article 34 Amendment filed in International Application No. PCT/US2009/066110, dated Nov. 15, 2010, 9 pgs.
BMW Motorrad article, "Single Wire Systems and CAN bus," www.bmwmotorrad.com/technology; printed Jul. 8, 2005.
BMW Motorrad Media Release, Overall Concept and Model Features, www/motorcycles.bmw.com.au/scripts/main.asp (Jul. 14, 2004); printed Jul. 8, 2005.
BMW Motorrad of Santa Cruz On-Line Article, "Electrics and Electronics,"www.bmwscruz.com/motorcycles/K1200S/K1200S_F4.html; printed Jul. 8, 2005.
BMW Motorrad of South Africa; The Motorcycles, RI200GS SA Road Test, www.bmwmotorrad.co.za/bikes/tests/display.asp?Id=100, (Feb. 2004 ed.); printed Jul. 8, 2005, 3 pgs.
BMW Motorrad RepROM R-Modelle K2x 1. Auflage; Nov. 2004 edition, (Copyright) BMW Motorrad, UX-VS-2; D-80778 Munchen; Nov. 2004; 1-Auflage; replacing main wiring harness, 19 pgs.
BMW Motorrad; R 1200 RT Sales Brochure; Printed in Germany in Mar. 2005; Front Cover, Rear Cover and p. 26—Information at Your Fingertips—The Single Wire System, 3 pgs.
Canadian Office Action issued by the Intellectual Property Office of Canada, dated Nov. 14, 2017; for Canadian Patent Application No. 2,952,447; 4 pages.
Constructive Communication, "4-Start Trailers Reduces Labor and Increases Door Strength by Incorporating Specialty Adhesives From LORD Corporation," National Association of Trailer Manufacturers: NATM Member Feature, Feb./Mar. 2006, 2 pages.
Decision of Grant from the Patent Office of the Russian Federation in associated Application No. 2011118453, dated Oct. 10, 2013; 7 pages.
European Patent Office, International Preliminary Report on Patentability for PCT/US2009/036315, dated Jun. 22, 2010, 19 pages.
European Patent Office, International Search Report for PCT/US2009/036315, dated Jul. 31, 2009, 6 pages.
European Patent Office, Written Opinion of the International Search Authority for PCT/US2009/036315, dated Jul. 31, 2009, 20 pages.
Examination Report issued by the European Patent Office, Rijswijk, NL, dated Feb. 21, 2012 for related European Application No. 09 720 174.3; 9 pages.
Ford Motor Company web page, "Ford's Mykey Feature Allows Fleet Owners to Control Speed and Radio Volume for Safety," 2 pgs., 2008, downloaded from www.ford.com/about-ford;news-announcements/press- releases.
Ford Motor Company, 2007 Explorer Owner's Guide (post-2002-fmt), pp. 1, and 124-126.
International Preliminary Report on Patentability Chapter II of the International Searching Authority for PCT/US2009/60123, dated Apr. 10, 2011.
International Preliminary Report on Patentability for International Application No. PCT/US2009/066110, 3 pgs.
International Preliminary Report on Patentability for PCT/US2013/025354 issued by the European Patent office, dated Jun. 4, 2014, 10 pages.
International Preliminary Report on Patentability, issued by the European Patent Office, dated Jun. 10, 2008, for International Application No. PCT/US2007/004895; 22 pages.
International Preliminary Report on Patentability, issued by the International Bureau of WIPO, Geneva, Switzerland, dated Jul. 19, 2011, for International Application No. PCT/US2009/066093; 9 pages.
International Search Report and Written Opinion issued by the European Patent Office for International Application No. PCT/US2013/025354, dated Sep. 18, 2014; 13 pages.
International Search Report and Written Opinion issued by the European Patent Office for PCT/US2015/010621, dated Aug. 12, 2014, 17 pages.
International Search Report and Written Opinion issued by the European Patent Office for PCT/US2015/010623, dated Mar. 24, 2015, 11 pages.
International Search Report and Written Opinion, issued by the European Patent Office, dated Jul. 22, 2010, for International Application No. PCT/US2009/066093; 14 pages.

(56) References Cited

OTHER PUBLICATIONS

International Search Report and Written Opinion, issued by the European Patent Office, dated Nov. 6, 2007 for International Application No. PCT/US2007/004895; 20 pages.

International Search Report for International Application No. PCT/US2009/066110, dated Mar. 18, 2010, 11 pgs.

International Search Report of the International Searching Authority for PCT/US2009/60123, dated Apr. 21, 2010.

Kayler, Kimberly, "LORD Corp.'s adhesives allow marine closure to cut costs," Design Applications Nov./Dec. 2005, 2 pages.

LORD Engineered Adhesives, 406 Medium Set, Modified Acrylic Adhesive, Product Information, May 2007, 6 pages.

LORD Engineered Adhesives: Case Studies, Scelzi Reduces Labor and Materials Costs with Lord Adhesives, 3 pages; Copyrgt. 1998-2008 LORD Corporation; available at www.lord.com.

LORD Product Catalog—LORD Engineered Adhesives: Structural Adhesive Solutions for Virtually Any Bonding Application, 15 pages, available at www.lord.com. Undated.

My Jeep Community—Welcome Jeep Owners, Enthusiasts, Employees and Suppliers! online community, 25 pages, downloaded on Jun. 8, 2009 from www.myjeepcommunity.com.

Office Action received for Canadian Patent Application No. 3031131, dated Apr. 26, 2021, 3 pages.

Photograph of the Polaris "Fusion." Undated.

RPM8000 TacTrack User Manual, Atgo Technologies, 11 pgs., Buffalo, MN, available at least as early as Mar. 2009.

RPM8000 TacTrack web page, "New RPM8000 Device Manager Software Available Free!," Atgo Technologies, 2 pgs., downloaded on Dec. 12, 2008 from www.atgotech.com.

Sport Rider Online Magazine; 2005 BMW K1200S, 5 pgs., downloaded on Jun. 30, 2005 from www/sportrider.com/bikes/2005/146.sub.-05.sub.-bmw.sub.-K12s/.

Tomblin, John (Wichita State University, Wichita, KS) and Kim, Hyonny (Purdue University, West Lafayette, IN), Adhesive Behavior in Aircraft Applications, 5 pages. Undated.

Valk, John, "The New BMW R1200 RT," 11 pgs., downloaded on Jul. 8, 2005 from www.johnvalkbmw.ca/2005/BMW/R1200RT/General-R1200RT-More.htm.

Written Opinion of the International Searching Authority for PCT/US2009/60123, dated Apr. 10, 2011.

* cited by examiner

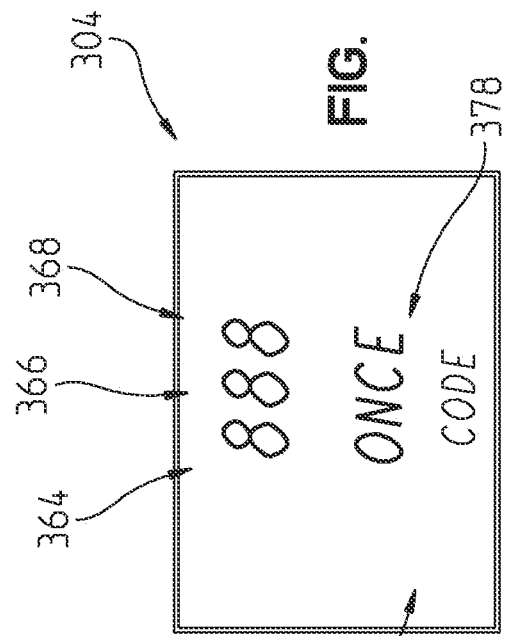
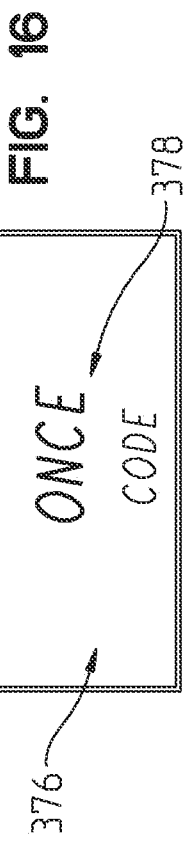
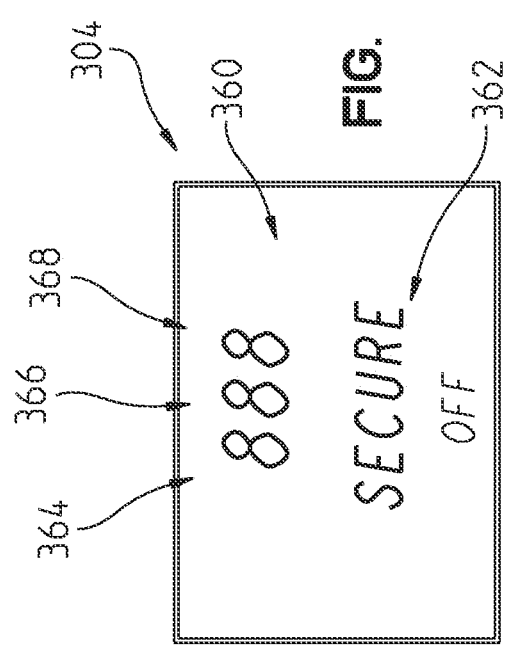
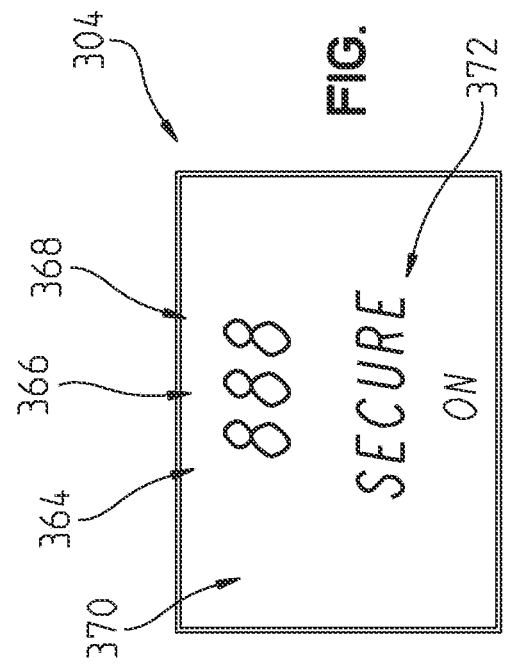

VEHICLE SECURITY SYSTEM

CROSS-REFERENCE TO RELATED APPLICATIONS

This application is a divisional of U.S. application Ser. No. 14/667,172, filed Mar. 24, 2015, which is a continuation of U.S. application Ser. No. 12/475,531, filed on May 31, 2009, now U.S. Pat. No. 8,994,494, which claims the benefit of U.S. Provisional Patent Application Ser. No. 61/104,436, filed Oct. 10, 2008, the disclosures of which are expressly incorporated by reference herein.

BACKGROUND AND SUMMARY

The present disclosure relates to security systems and playback systems for vehicles.

It is known to disable a vehicle when a key of the vehicle is spaced apart from the vehicle and to control the performance level of a vehicle based on an ID code received from a transponder. It is also known to use external devices to record engine management system information during rides. Polaris Industries, Inc., the assignee of the present application, provides a DIGITAL WRENCH brand diagnostic application which may receive engine management system information stored in a snow mobile or other equipped vehicle.

In an exemplary embodiment of the present disclosure, a vehicle is provided with a security system. In another exemplary embodiment of the present disclosure, a vehicle is provided with a playback module.

In yet another exemplary embodiment of the present disclosure, a vehicle is provided. The vehicle comprising a plurality of ground engagement members; a frame supported by the plurality of ground engagement members; a power system supported by the frame and operatively coupled to at least one of the plurality of ground engagement members to power movement of the vehicle; a controller operatively coupled to the power system to control an operation of the power system; at least one user input device operatively coupled to the controller; and at least one user output device operatively coupled to the controller. The controller includes a vehicle security module having a secure once mode of operation and a secure all mode of operation. During a current start-up of the power system the operation of the power system being in a limited state until a valid security code is provided to the controller through the at least one user input. The reception of the valid security code in the secure once mode of operation disables the vehicle security module for the current start-up and all subsequent start-ups of the power system and permits the operation of the power system in a normal operating state and the reception of the valid security code in the secure all mode of operation disables the vehicle security module for only the current start-up and permits the operation of the power system in the normal operating state. In an example, the limited state prevents a powered movement of the vehicle through the operation of the power system. In another example, the limited state is an idle state. In yet another example, the power system includes a CVT and a prime mover and the limited state allows the prime mover to operate at a level below an engagement speed of the CVT. In a variation thereof, the prime mover is an internal combustion engine. In another variation, the vehicle security module shuts off the power system during the current start-up after a predetermined time period if the valid security code has not been provided. In yet another variation thereof, the vehicle further comprises a temperature sensor monitoring a temperature associated with the prime mover, wherein the prime mover is an internal combustion engine and the vehicle security module shuts off the power system during the current start-up after a predetermined time period if the valid security code has not been provided and if the monitored temperature associated with the prime mover is above a threshold temperature. In a further variation thereof, the internal combustion engine is a liquid cooled engine and the temperature sensor monitors a temperature of a liquid of the liquid cooled engine. In still another example, the at least one input device includes a plurality of buttons associated with an instrument cluster, the at least one output device includes a display associated with the instrument cluster, and the security code is a numeric code which is input through the plurality of buttons. In yet still another example, the valid security code is one of a plurality of possible security codes each of the possible security codes having a preset configuration for the operation of the vehicle. In a variation thereof, when the valid security code corresponds to a first possible security code the controller configures the vehicle in a novice mode of operation. In another variation thereof, when the valid security code corresponds to a second possible security code the controller configures the vehicle in an expert mode of operation. In yet another variation thereof, when the valid security code corresponds to a third possible security code the controller configures the vehicle in a cruise mode of operation. In still another variation thereof, when the valid security code corresponds to a fourth possible security code the controller configures the vehicle in a normal mode of operation. In yet still another example, the controller further includes a playback module which records ride information associated with the vehicle. In a variation thereof, the ride information includes vehicle speed and navigation data stored in a memory accessible by the controller.

In yet another exemplary embodiment of the present disclosure, a method of operation of a vehicle is provided. The method of operation comprising the steps of providing a vehicle having a plurality of ground engagement members, a prime mover, and a CVT operatively coupling the prime mover to at least one of the plurality of ground engagement members to power movement of the vehicle; configuring the vehicle in a secure once mode of operation; and limiting an output of the prime mover to a level which is below an engagement speed of the CVT until a valid security code is provided through at least one user input. In an example thereof, the method further comprises the steps of monitoring a temperature of the prime mover; and shutting off the a power system of the vehicle which includes the prime mover when the temperature of the prime mover reaches a threshold temperature if the valid security code has not been provided through the at least one user input.

In yet still another exemplary embodiment of the present disclosure, a method of operation of a vehicle is provided. The method of operation comprising the steps of providing a vehicle having a plurality of ground engagement members, a prime mover, and a CVT operatively coupling the prime mover to at least one of the plurality of ground engagement members to power movement of the vehicle; configuring the vehicle in a secure all mode of operation; and limiting an output of the prime mover to a level which is below an engagement speed of the CVT until a valid security code is provided through at least one user input. In an example thereof, the method further comprises the steps of: monitoring a temperature of the prime mover; and shutting off the a power system of the vehicle which includes the prime mover when the temperature of the prime mover reaches a threshold temperature if the valid security code has not been provided through the at least one user input.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 14 illustrates a first exemplary display screen of the operator interface of FIG. 9;

FIG. 15 illustrates a second exemplary display screen of the operator interface of FIG. 9;

FIG. 16 illustrates a third exemplary display screen of the operator interface of FIG. 9;

FIG. 17 illustrates a fourth exemplary display screen of the operator interface of FIG. 9;

Corresponding reference characters indicate corresponding parts throughout the several views. Unless stated otherwise the drawings are proportional with the exception of the flowcharts and block representations.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a snowmobile, it should be understood that the features disclosed herein may have application to other types of vehicles such as all-terrain vehicles, motorcycles, watercraft, side-by-side vehicles, utility vehicles, and golf carts.

Figure 1:
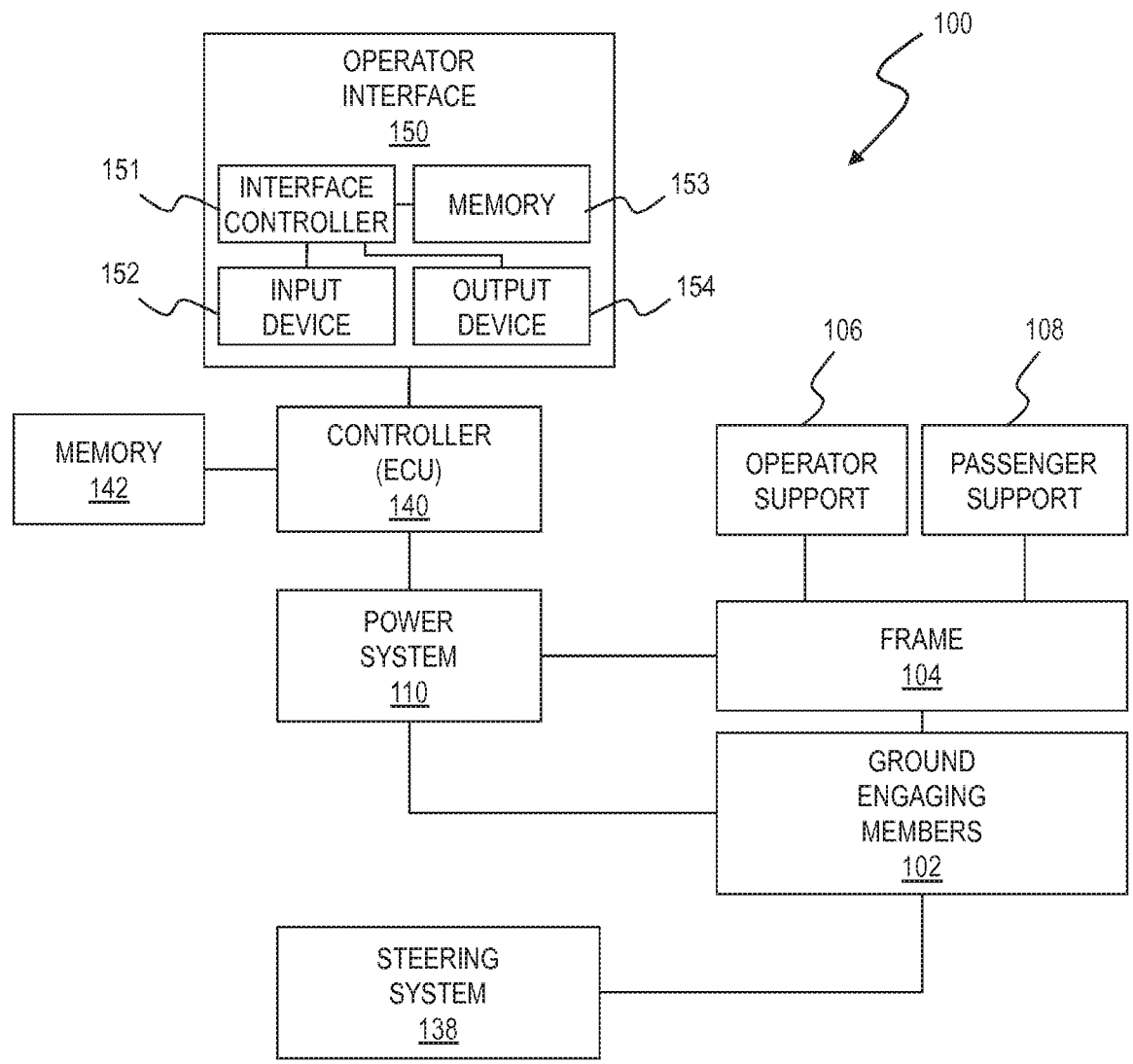
FIG. 1 illustrates a representative view of a vehicle.

Referring to FIG. 1, vehicle 100 is represented. Vehicle 100 includes a plurality of ground engaging members 102. Exemplary ground engaging members include skis, endless tracks, wheels, and other suitable devices which support vehicle 100 relative to the ground. Vehicle 100 further includes a frame 104 supported by the plurality of ground engaging members 102. In one embodiment, frame 104 includes cast portions, weldments, tubular components or a combination thereof. In one embodiment, frame 104 is a rigid frame. In one embodiment, frame 104 has at least two sections which are moveable relative to each other.

Supported by frame 104 is an operator support 106. Exemplary operator supports include straddle seats, bench seats, bucket seats, and other suitable support members. In addition to operator support 106, vehicle 100 may further include a passenger support 108. Exemplary passenger supports include straddle seats, bench seats, bucket seats, and other suitable support members.

Supported by frame 104 is a power system 110. Power system 110 provides the motive force and communicates the same to at least one of the ground engagement members 102 to power movement of vehicle 100.

Figure 2:
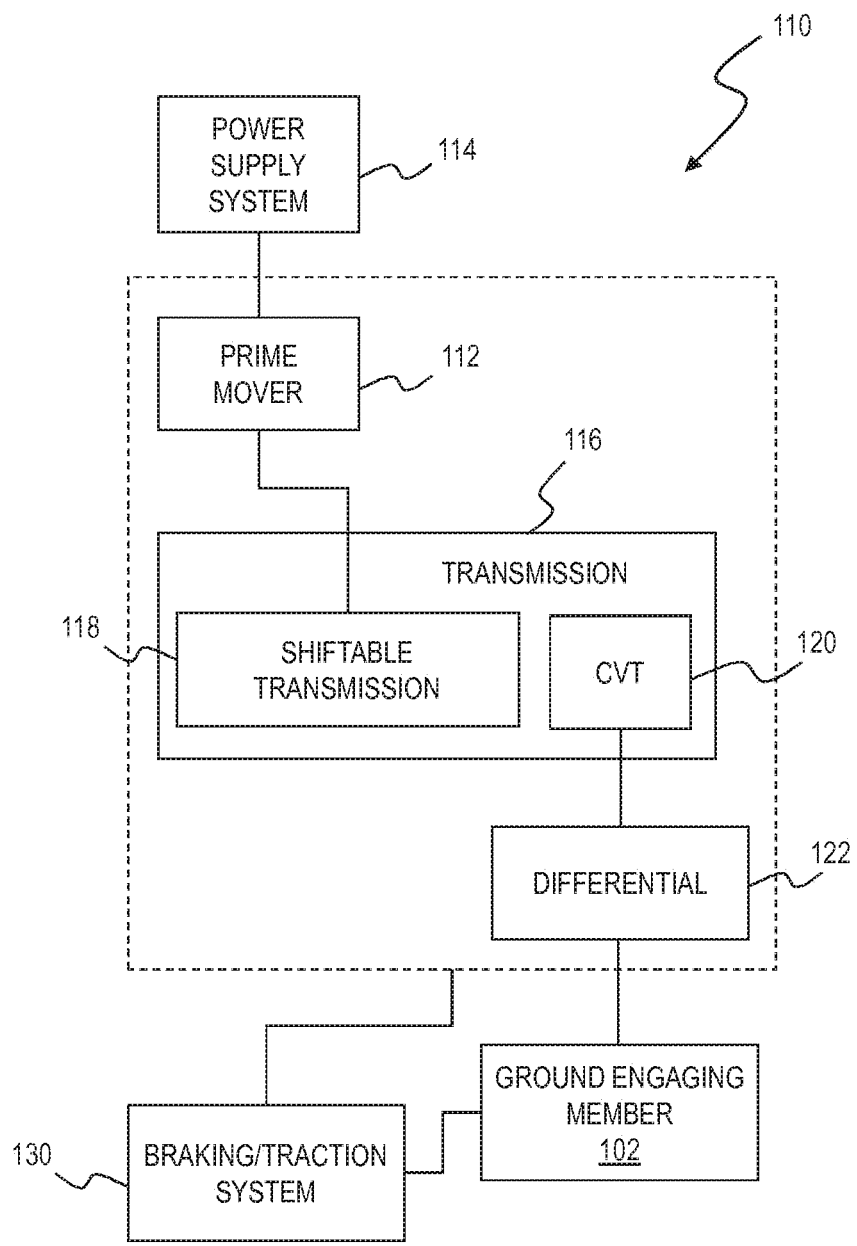
FIG. 2 illustrates a representative view of a power system of the vehicle of FIG. 1.

Referring to FIG. 2, one embodiment of power system 110 is illustrated. Power system 110 includes a prime mover 112. Exemplary prime movers 112 include internal combustion engines, two stroke internal combustion engines, four stroke internal combustion engines, electric engines, hybrid engines, and other suitable sources of motive force. To start the prime mover 112, a power supply system 114 is provided. The type of power supply system 114 depends on the type of prime mover 112 used. In one embodiment, prime mover 112 is an internal combustion engine and power supply system 114 is one of a pull start system and an electric start system. In one embodiment, prime mover 112 is an electric engine and power supply system 114 is a switch system which electrically couples one or more batteries to an electric motor.

A transmission 116 is coupled to prime mover 112. Transmission 116 is illustrated as having a shiftable transmission 118 coupled to prime mover 112 and a continuously variable transmission ("CVT") 120 coupled to shiftable transmission 118. In one embodiment, shiftable transmission 118 includes a forward high setting, a forward low setting, a neutral setting, a park setting, and a reverse setting. The power communicated from shiftable transmission 118 to CVT 120 is provided to a drive member of CVT 120. The drive member in turn provides power to a driven member through a belt. Exemplary CVTs are disclosed in U.S. Pat. Nos. 3,861,229; 6,176,796; 6,120,399; 6,860,826; and 6,938,508, the disclosures of which are expressly incorporated by reference herein. Although transmission 116 is illustrated as including both shiftable transmission 118 and CVT 120, transmission 116 may include only one of shiftable transmission 118 and CVT 120.

Transmission 116 is further coupled to at least one differential 122 which is in turn coupled to at least one ground engaging members 102. Differential 122 may communicate the power from transmission 116 to one of ground engaging members 102 or multiple ground engaging members 102. In an ATV embodiment, one or both of a front differential and a rear differential are provided. The front differential powering at least one of two front wheels of the ATV and the rear differential powering at least one of two rear wheels. In a utility vehicle embodiment, one or both of a front differential and a rear differential are provided. The front differential powering at least one of two front wheels of the utility vehicle and the rear differential powering at least one of multiple rear wheels of the utility vehicle. In one example, the utility vehicle has three axles and a differential is provided for each axle. In a motorcycle embodiment, a differential 122 and CVT 120 are not included. Rather, shiftable transmission 118 is coupled to at least one rear wheel through a chain or belt. In another motorcycle embodiment, a differential 122 is not included. Rather, CVT 120 is coupled to at least one rear wheel through a chain or belt. In a snowmobile embodiment, a differential 122 is not included. Rather, CVT 120 is coupled to an endless track through a chain case. In one golf cart embodiment, a transmission is not included. Rather an electric motor is coupled directly to a differential 122. An exemplary differential is a helical gear set. The motor can be run in a first direction for forward operation of the golf cart and in a second direction for reverse operation of the golf cart. Although mentioned in connection with a golf cart, the concepts described herein may be used in connection with any electric vehicle.

Vehicle 100 further includes a braking/traction system 130. In one embodiment, braking/traction system 130 includes anti-lock brakes. In one embodiment, braking/traction system 130 includes active descent control and/or engine braking. In one embodiment, braking/traction system 130 includes a brake and in some embodiments a separate parking brake. Braking/traction system 130 may be coupled to any of prime mover 112, transmission 116, differential 122, and ground engaging members 102 or the connecting drive members therebetween.

Returning to FIG. 1, vehicle 100 further includes a steering system 138. Steering system 138 is coupled to at least one of the ground engagement members 102 to direct vehicle 100.

Figure 3:
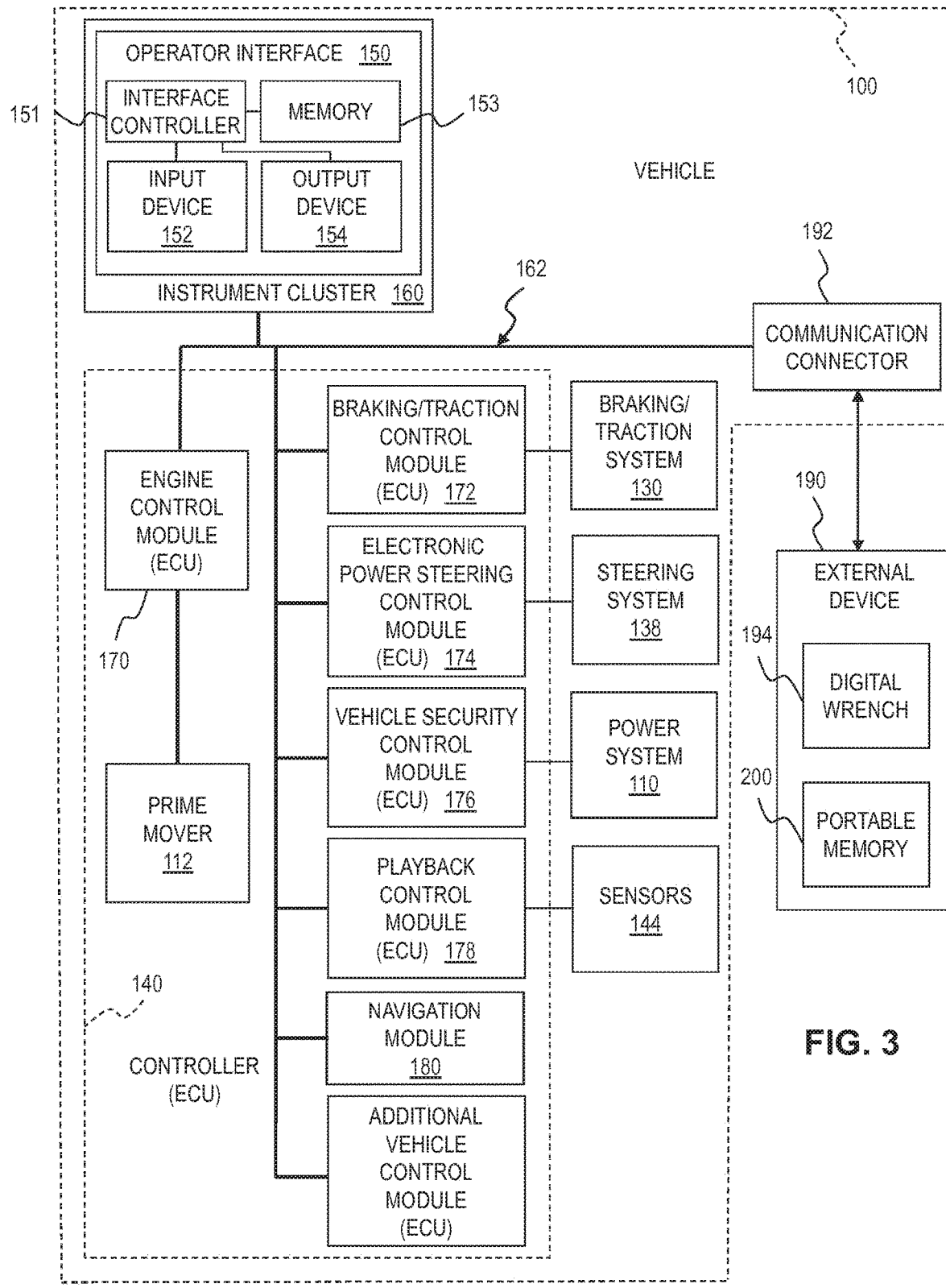
FIG. 3 illustrates a representative view of a controller of the vehicle of FIG. 1.

Further, vehicle 100 includes a controller 140 having at least one associated memory 142. Controller 140 provides the electronic control of the various components of vehicle 100. Further, controller 140 is operatively coupled to a plurality of sensors 144 (see FIG. 3) which monitor various parameters of vehicle 100 or the environment surrounding vehicle 100. Controller 140 also interacts with an operator interface 150 which includes at least one input device 152 and at least one output device 154. Exemplary input devices 152 include levers, buttons, switches, soft keys, and other suitable input devices. Exemplary output devices include lights, displays, audio devices, tactile devices, and other suitable output devices. Operator interface 150 further includes an interface controller 151 and an associated memory 153. Referring to FIG. 3, operator interface 150 is included as part of an instrument cluster 160.

As illustrated in the embodiment of FIG. 3, controller 140 is not a single module, but may be comprised of multiple modules which may communicate over a network 162. It should be understood that memory 142 may be representative of multiple memories. In one embodiment, each of the modules includes a respective memory. Of course, it is possible to have a single module which functions to perform all of the necessary operations of controller 140. In one embodiment, network 162 is a CAN network. In one embodiment, the CAN network is implemented in accord with the J1939 protocol. Details regarding an exemplary CAN network are disclosed in U.S. patent application Ser. No. 11/218,163, filed Sep. 1, 2005, the disclosure of which is expressly incorporated by reference herein. Of course any suitable type of network or data bus may be used in place of the CAN network. In one embodiment, two wire serial communication is used.

Referring to FIG. 3, controller 140 includes an engine control module 170 which controls the operation of prime mover 112. In one example, prime mover 112 is an internal combustion engine and engine control module 170 controls the provision of fuel, provision of spark, engine performance, reverse operation of vehicle, locking differential, all wheel drive, ignition timing, electrical power distribution, transmission control. Further, engine control module 170 monitors a plurality of sensors. Exemplary sensors include a temperature sensor which monitors the temperature of a coolant which circulates through the engine, throttle position sensor (TPS), exhaust gas temperature sensor (EGT), crank position sensor (CPS), detonation sensor (DET), airbox pressure sensor, intake air temperature sensor, and other parameters as required to control the engine performance.

Controller 140 further includes a braking/traction control module 172 which controls the operation of braking/traction system 130. In one example, braking/traction control module 172 controls pressure and frequency of actuation of the brake caliper. Further, braking/traction control module 172 monitors a plurality of sensors. Exemplary sensors include a vehicle speed sensor which monitors track speed and an engine RPM sensor.

Controller 140 further includes an electronic power steering control module 174 which controls the operation of steering system 138. In one example, electronic power steering control module 174 controls am amount of assist provided by a power steering unit of vehicle 100. Further, electronic power steering control module 174 monitors a plurality of sensors. Exemplary sensors and electronic power steering units, including speed profiles, are provided in U.S. patent application Ser. No. 12/135,107, assigned to the assignee of the present application, titled VEHICLE, the disclosure of which is expressly incorporated by reference herein.

Controller 140 further includes a vehicle security control module 176 which controls the operation of power system 110. In one embodiment, vehicle security control module 176 is part of interface controller 151. Additional details regarding vehicle security control module 176 are provided herein. Controller 140 further includes a playback control module 178 which records various sensor data received from sensors 144 and/or records various determined values which are based on the received sensor data. In one embodiment, playback control module 178 is part of interface controller 151. In one embodiment, vehicle security control module 176 and playback control module 178 are part of interface controller 151. Additional details regarding playback control module 178 are provided herein.

Controller 140 further includes a navigation module 180 which records information indicative of a position of vehicle 100 and/or records the position of vehicle 100. An exemplary navigation system is a GPS unit which determines the position of vehicle 100 based on interaction with a global satellite system.

Memory 142 may be representative of multiple memories which are provided locally with engine control module 170, braking/traction control module 172, electronic power steering control module 174, vehicle security control module 176, playback control module 178, and navigation module 180. The information recorded or determined by one or more modules of controller 140 may be accessible by an external device 190. In one embodiment, controller 140 communicates with external device 190 through a wireless network. In one embodiment, external device 190 is coupled to a communication connector 192 provided on vehicle 100.

In one embodiment, external device 190 runs diagnostic tests on vehicle 100, updates software associated with controller 140, and retrieves error messages generated by controller 140. In one embodiment, the external device 190 is used to re-flash software for instrument cluster 302, for the engine control module 170, or any other portion of controller 140.

Figure 4:
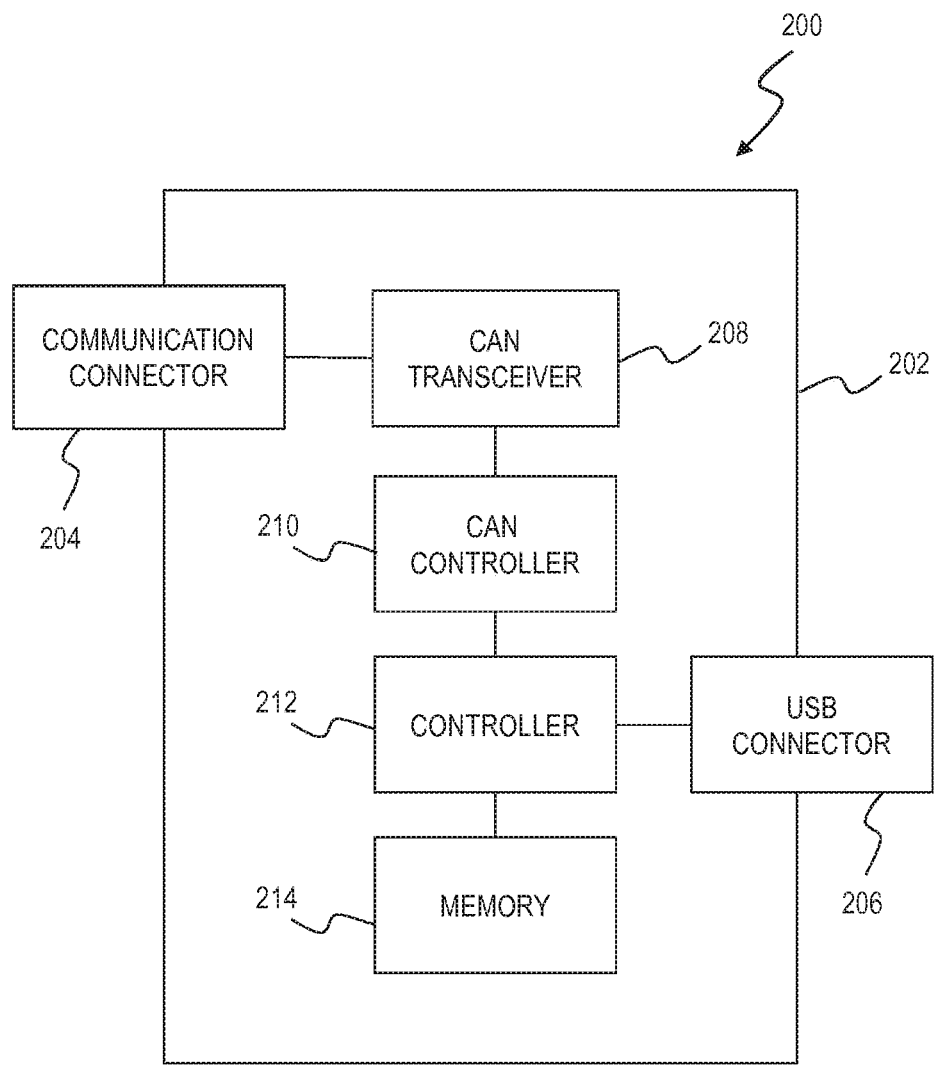
FIG. 4 illustrates a representative view of a portable memory device which communicates with the controller of the vehicle of FIG. 1.

In one embodiment, external device 190 is a portable memory device 200 which may download information associated with playback control module 178 and navigation module 180 from vehicle 100. Referring to FIG. 4, an exemplary portable memory device 200 is shown. Portable memory device 200 includes a housing 202, a first communication connector 204 accessible from the exterior of housing 202, and a second communication connector 206 accessible from the exterior of housing 202. Communication connector 204 is configured to couple to communication connector 192. In one embodiment, communication connector 192 and communication connector 204 are mating connectors. Communication connector 206 in the illustrated embodiment is a USB connector. Other exemplary connectors include mini USB. In one embodiment, connector 204 is replaced with a transceiver (vehicle 100 also includes a transceiver) for wireless communication between external device 190 and vehicle 100.

Portable memory device 200 includes a CAN transceiver 208 and a CAN controller 210 which permit portable memory device 200 to communicate with controller 140 over a CAN network 162. Portable memory device 200 further includes a controller 212 which permits portable memory device 200 to communicate with other devices through second connector 206, such as a personal computer or other device. Portable memory device 200 further includes a memory 214 on which information associated with playback control module 178 and navigation module 180 transferred from vehicle 100 may be stored.

Vehicle 100 may be any suitable type of vehicle for transporting an operator through power provided by a power system 110. The operation of vehicle security control module 176, playback control module 178, and navigation module 180 are described herein in reference to the operation of a snowmobile 250 shown in FIGS. 5-9. However, the disclosure is applicable to other types of vehicles such as all terrain vehicles, motorcycles, watercraft, utility vehicles, side-by-side vehicles, and golf carts.

Figure 5:
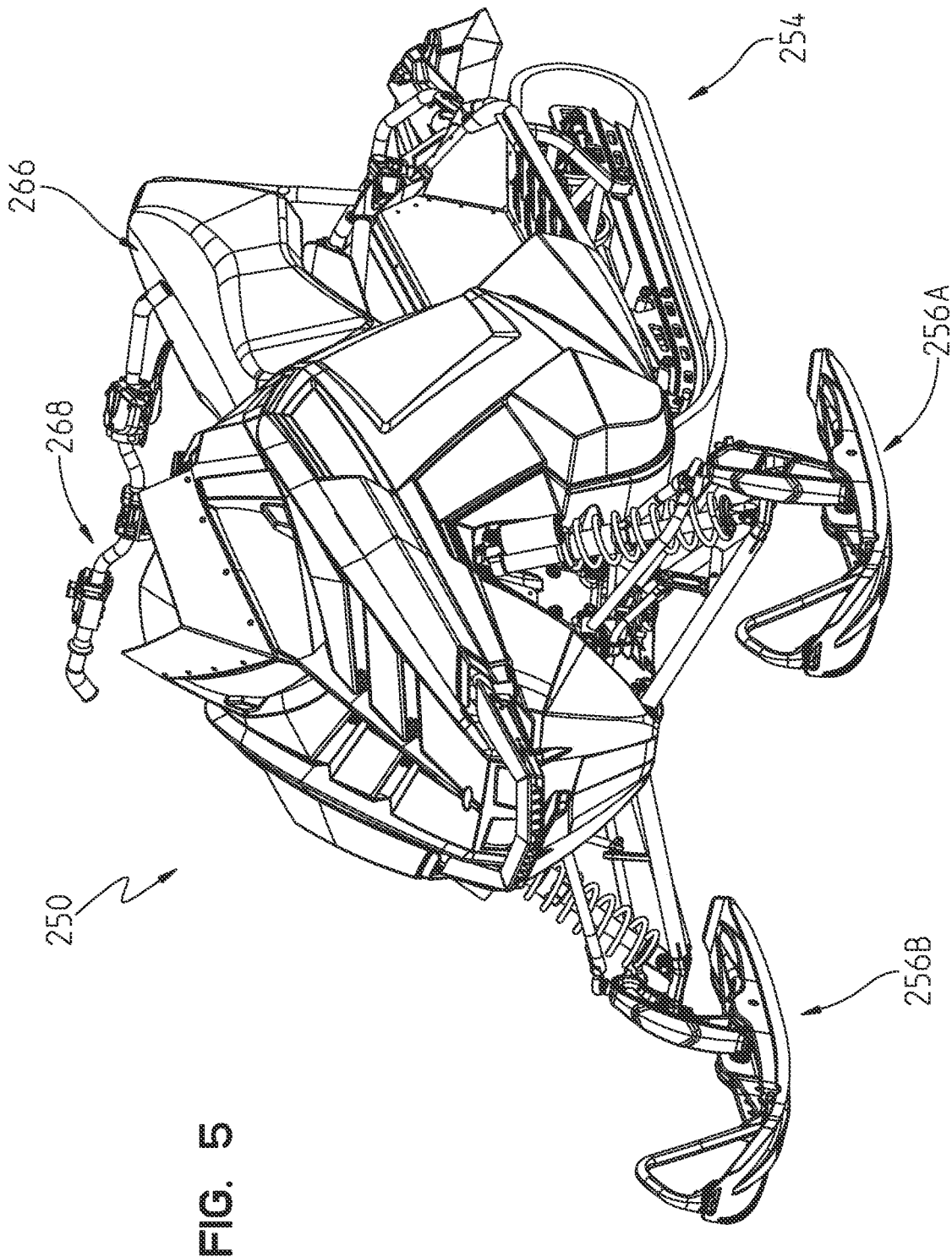
FIG. 5 illustrates a front, left, perspective view of an exemplary snowmobile.
Figure 6:
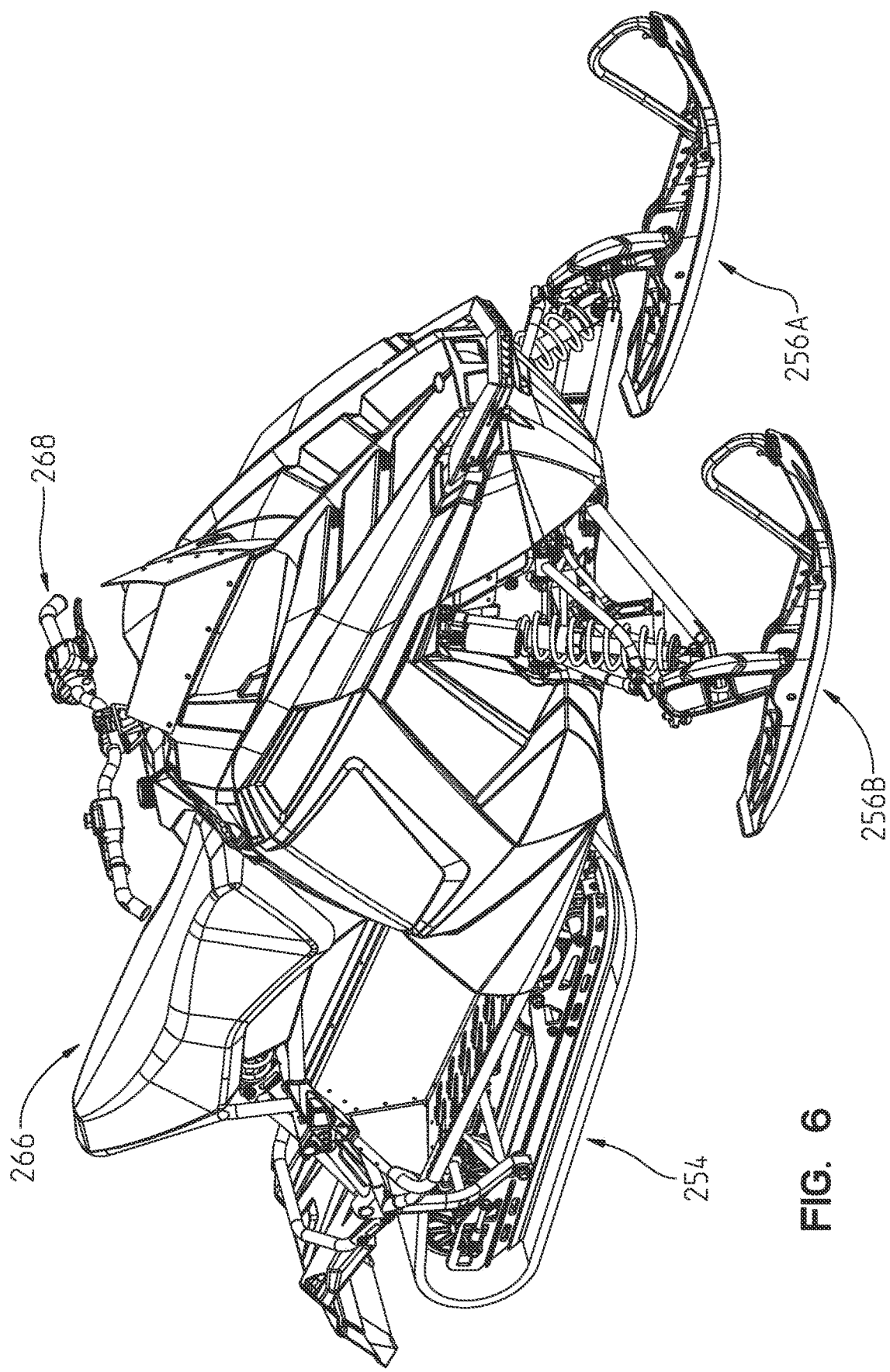
FIG. 6 illustrates a front, right, perspective view of the snowmobile of FIG. 5.
Figure 7:
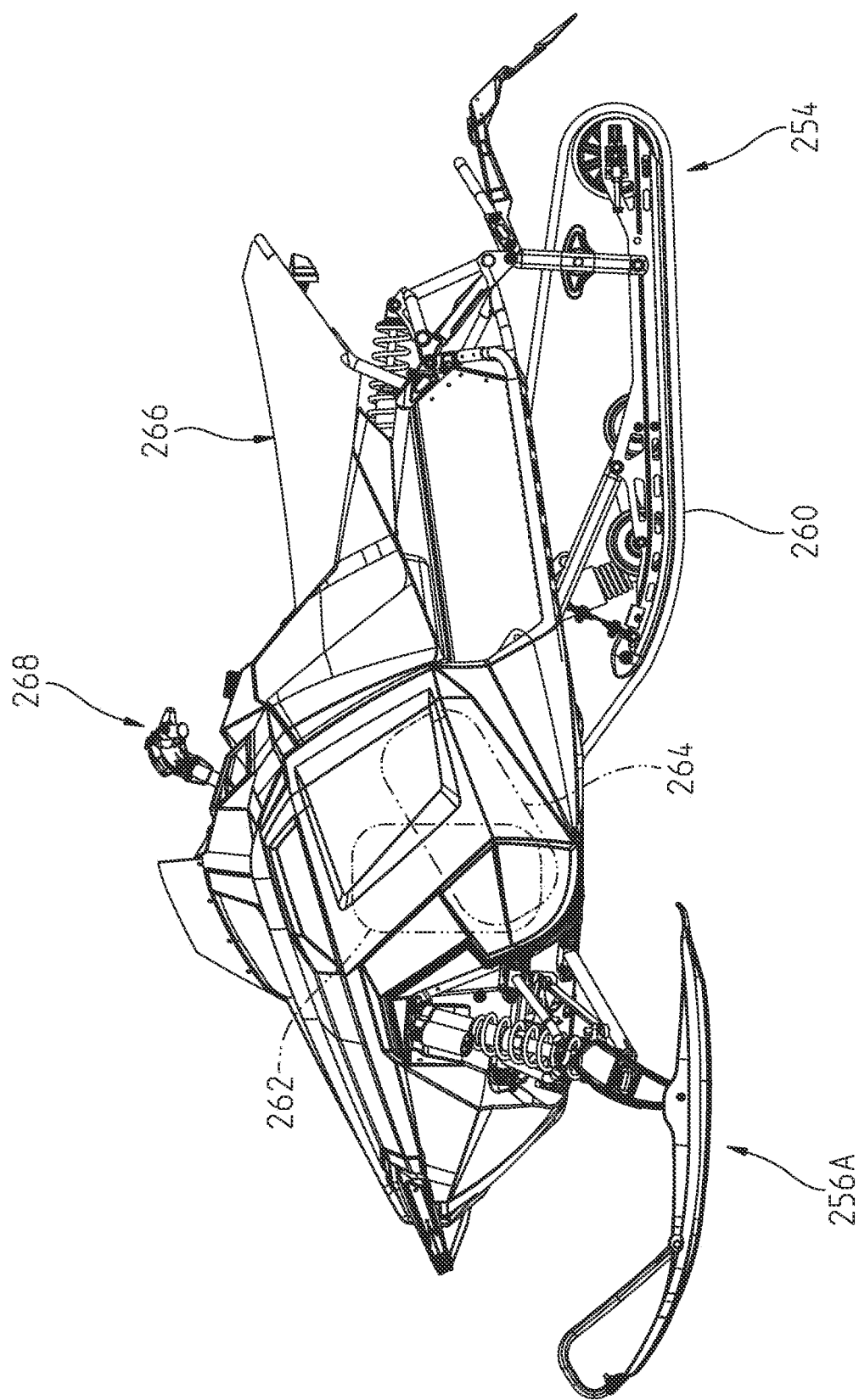
FIG. 7 illustrates a left, side view of the snowmobile of FIG. 5.

Referring to FIG. 5, a snowmobile 250 is shown. Snowmobile 250 includes an endless track assembly 254 and a pair of front skis 256A and 256B. Endless track assembly 254 supports a rear portion of snowmobile 250 while skis 256 support a front portion of snowmobile 250. Endless track assembly 254 includes a belt 260 which is coupled to a prime mover 112 (see FIG. 7) through a CVT 120 (see FIG. 7). Front skis 256 are oriented by an operator positioned on seat 266 through handlebars 268. Additional details regarding snowmobile 250 are provided in U.S. Provisional Patent Application Ser. No. 61/104,436, filed Oct. 10, 2008, titled SNOWMOBILE, the entire disclosure of which is expressly incorporated by reference herein.

Figure 8:
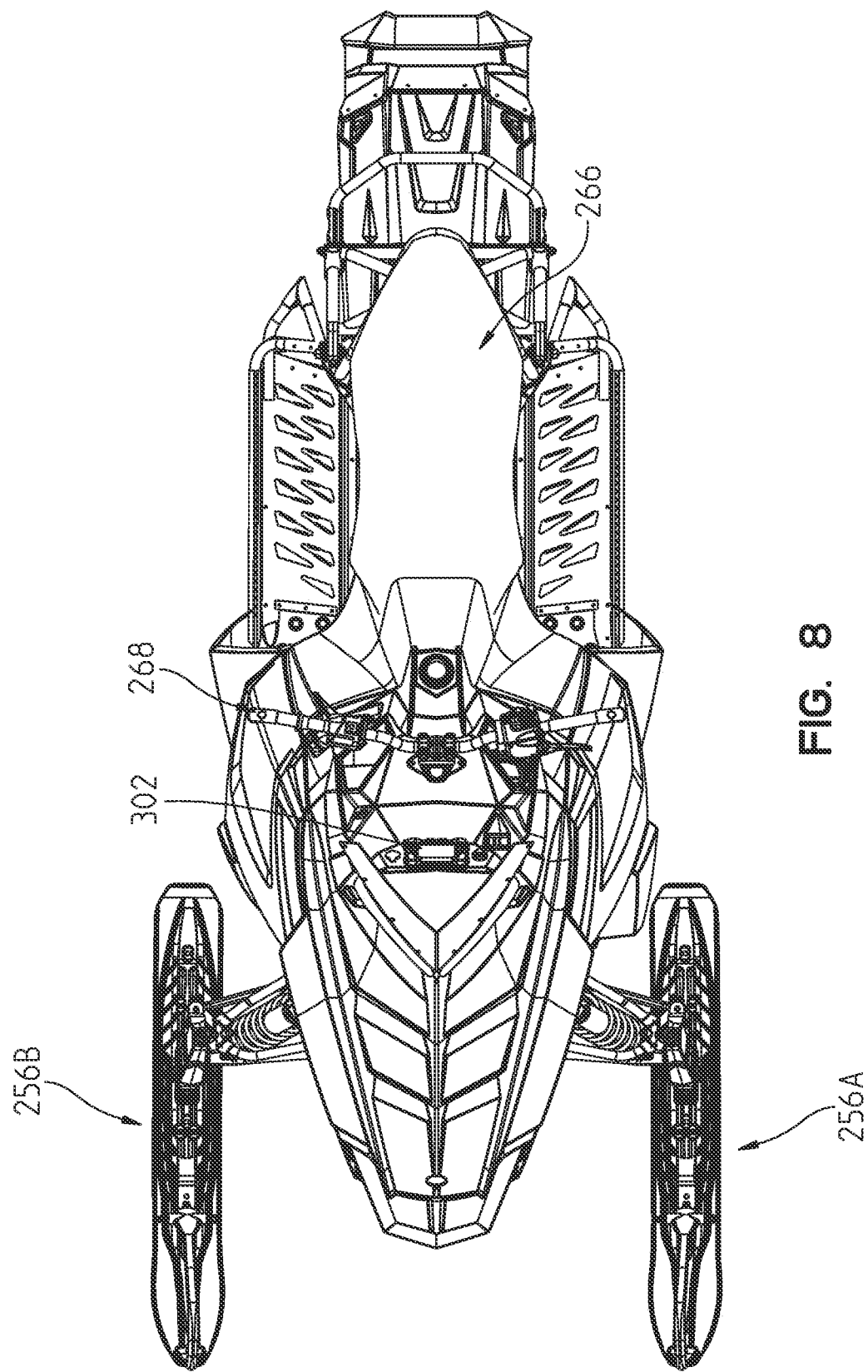
FIG. 8 illustrates a top view of the snowmobile of FIG. 5.
Figure 9:
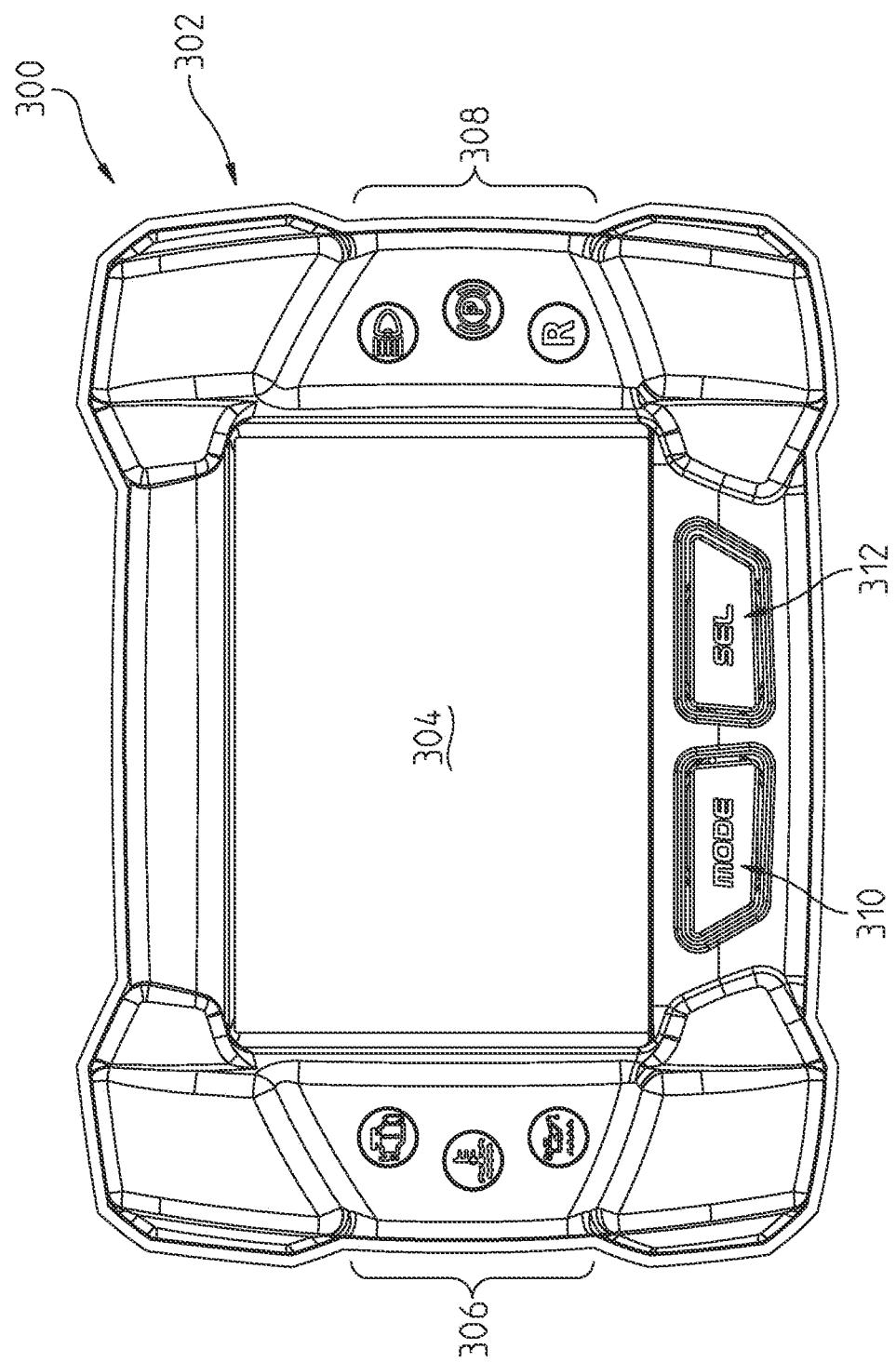
FIG. 9 illustrates a front view of an exemplary operator interface of the snowmobile of FIG. 5.

Snowmobile 250 includes a controller based on FIG. 3. Referring to FIG. 9, an operator interface 300 of snowmobile 250 is shown as instrument cluster 302. As shown in FIG. 8, instrument cluster 302 is viewable by an operator on seat 266 and forward of handlebars 268. Instrument cluster 302 includes as output devices 154, an LCD segmented display 304 and first and second banks of indicator lights 306 and 308. Instrument cluster 302 includes as input devices 152, a MODE button 310 and a SEL button 312. As explained herein, instrument cluster 302 provides an operator an interface to communicate with vehicle security control module 176 and playback control module 178.

In one embodiment, instrument cluster 160 (such as instrument cluster 302) also includes at least the vehicle security control module 176 and the playback control module 178 of controller 140 as part of interface controller 151. In one embodiment, interface controller 151 also includes navigation module 180. Data produced by and processing sequences of vehicle security control module 176, playback control module 178, and navigation module 180 are stored in memory 153.

Security control module 176 adjusts the operation of power system 110 to lower the risk that vehicle 100 may be stolen or used without authorization. Further, security control module 176 may adjust the operation of power system 110 based on the experience level of the operator. In one embodiment, the adjustments are made by making an identifier available to engine control module 170, braking/traction control module 172, electronic power steering control module 174, and any additional vehicle control modules over network 162. An exemplary process of configuring a vehicle by making an identifier available over a network is provided in U.S. patent application Ser. No. 11/218,163, the disclosure of which is expressly incorporated by reference herein.

The operation of power system 110 may be adjusted and based on the output of a security control module 176 of controller 140. As explained herein, in one embodiment, security control module 176 alters the operation of vehicle 100 based upon whether or not the correct security code or indicator has been provided to vehicle 100. In one embodiment, as explained herein security codes and inputs are provided to controller 140 or interface controller 151 through input device 152 and indications are provided back to the operator through output device 154.

Figure 10:
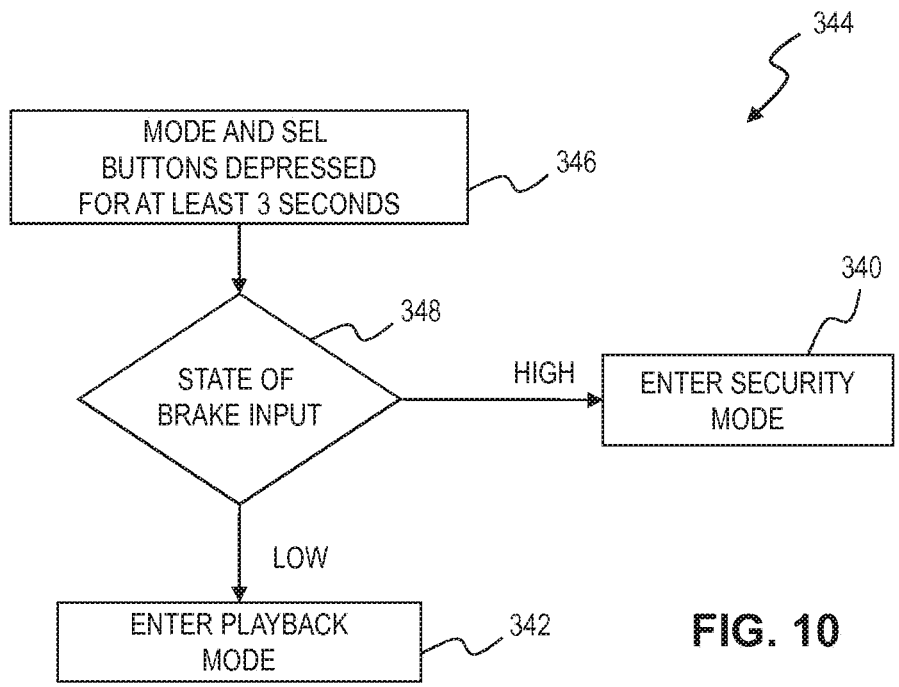
FIG. 10 illustrates a process sequence of the controller of the vehicle in FIG. 1 of differentiating between the selection of a security mode and a playback mode.

Referring to FIG. 10, an operator of vehicle 100 may enter a security mode of operation 340 or a playback mode of operation 342. Each of security mode of operation 340 and playback mode of operation 342 are discussed herein. Both of security mode of operation 340 and playback mode of operation 342 are optional and are not required for the proper operation of vehicle 100. That said, if security mode of operation 340 is active the operation of vehicle 100 may be limited due to vehicle 100 being in the security mode of operation 340.

A processing sequence 344 whereby controller is placed in one of the security mode of operation 340 and playback mode of operation 342 is shown in FIG. 10. Controller 140 or interface controller 151 receives an indication that an operator has depressed both MODE button 310 and SEL button 312 for a predetermined period of time, as represented by block 346. An exemplary predetermined period of time is at least 3 seconds. Controller 140 or interface controller 151 also through braking/traction control module 172 checks a state of a brake input, as represented by block 348. If the brake of vehicle 100 is set (a HIGH input from an associated brake light sensor) then controller 140 or interface controller 151 enters security mode of operation 340. If the brake of vehicle 100 is not set (a LOW input from the associated brake sensor) then controller 140 or interface controller 151 enters playback mode of operation 342. In one embodiment, vehicle 100 includes a separate parking brake and the status of the parking brake is checked.

Although the state of the brake of vehicle 100 is used as a differentiator between which mode of operation, other differentiators may be used. Exemplary differentiators include a switch, a knob, other suitable user actuated input devices, or any parameter monitored by one of the modules of vehicle 100 which is accessible over the CAN network.

Figure 11:
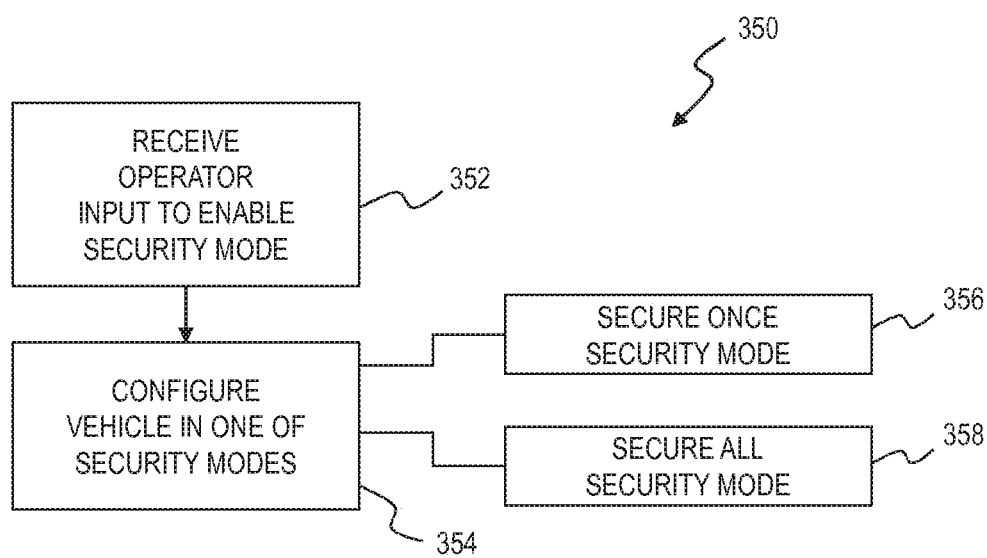
FIG. 11 illustrates a process sequence of the controller of the vehicle in FIG. 1 configuring the vehicle in one of a secure once security mode and a secure all security mode.

Referring to FIG. 11, a processing sequence 350 for security mode of operation 340 is represented. Controller 140 or interface controller 151 receives the operator input to enable a security mode, as represented by block 352. Controller 140 or interface controller 151 configures vehicle 100 to operate in one of a plurality of security modes based on input received from the operator, as represented by block 354. In one example, controller 140 or interface controller 151 configures vehicle 100 to operate in a secure once security mode, as represented by block 356. In secure once security mode of operation 356, snowmobile 250 starts in a secure mode only at the next start and thereafter will start in a non-secure mode. This situation is ideal for when the operator is parking their vehicle in a public or unfamiliar location, such as stopping for lunch on a trail. In another example, controller 140 or interface controller 151 configures vehicle 100 to operate in a secure all security mode, as represented by block 358. In secure all security mode of operation 358, snowmobile 250 starts in a secure mode for each subsequent start of snowmobile 250.

Referring to FIG. 14, an exemplary screen 360 presented on display 304 is shown. Screen 360 is displayed when snowmobile 250 is started and a secure mode is not active for snowmobile 250 as indicated by text 362. As shown on display 304, three digits 364, 366, and 368 are also provided. These may be used to provide feedback on numbers entered for the security code. In a non-secure mode, vehicle 100 operates normally and the three digits operate as a tachometer. In a secure mode, during a current start-up of power system 110, power system 110 is limited. In one example, prime mover 112 is limited. In one embodiment of snowmobile 250, the prime mover output is limited to a level below an engagement rpm for CVT 120. In the case of an internal combustion engine, the engine rpm may be limited. Exemplary ways of limiting engine rpm include restricting the provision of fuel to the engine and interrupting the spark of the igniters of the engine. The engine remains limited until a correct security code is provided.

Referring to FIG. 15, a screen 370 corresponding to when vehicle 100 is started in a secure mode as indicated by text 372 is shown. As stated herein, an operator may initiate a secure once security mode of operation 356 for snowmobile 250 or a secure all security mode of operation 358 for snowmobile 250. Referring to FIG. 16, a screen 376 is shown which corresponds to when a secure once security mode of operation 356 has been selected for snowmobile 250 as indicated by text 378. Referring to FIG. 17, a screen 380 is shown which corresponds to when a secure all security mode of operation 358 has been selected for snowmobile 250 as indicated by text 382.

Figure 12:
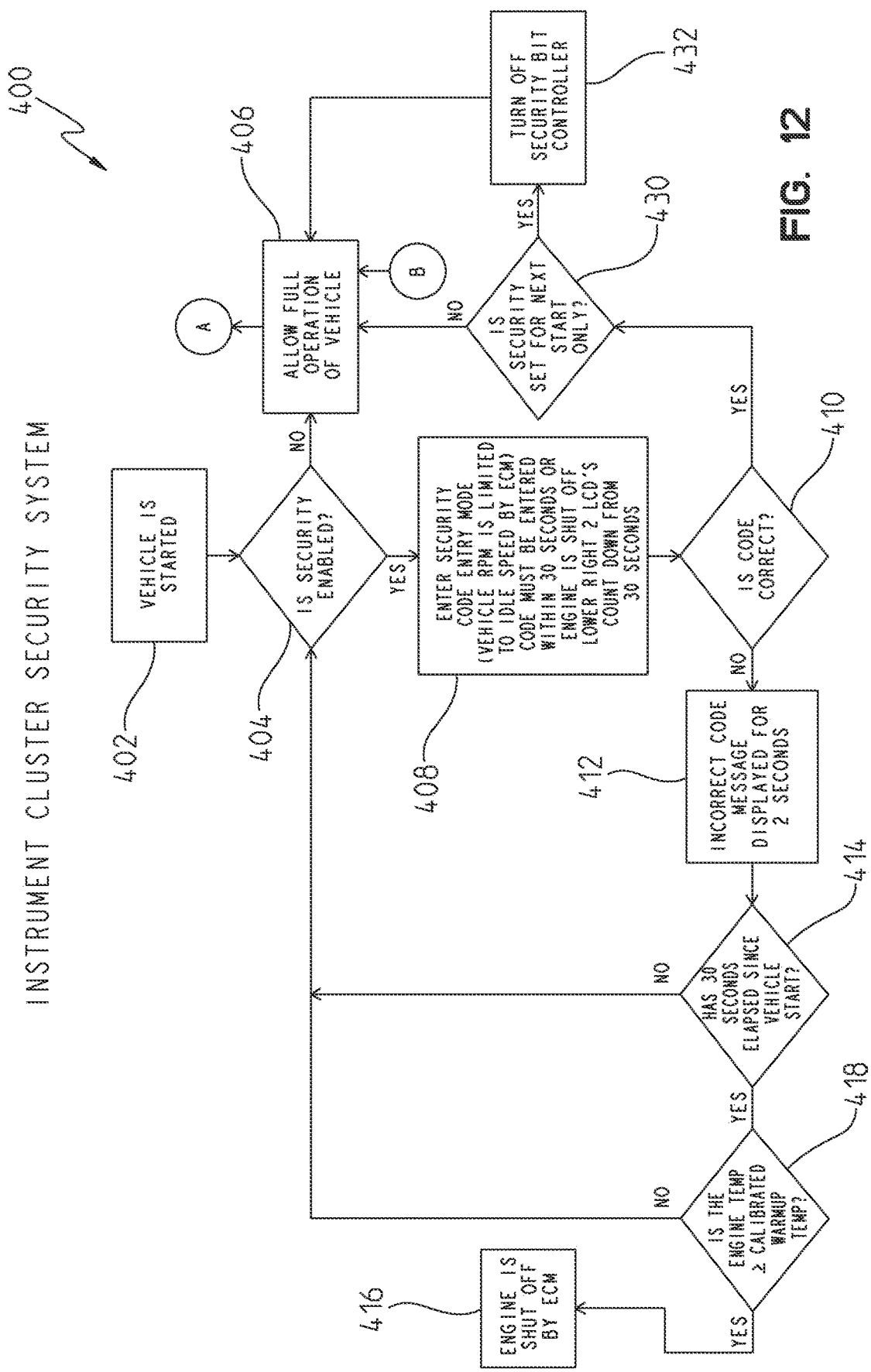
FIGS. 12 and 13 illustrate a process sequence of the controller of the vehicle in FIG. 1 for the security mode.
Figure 13:
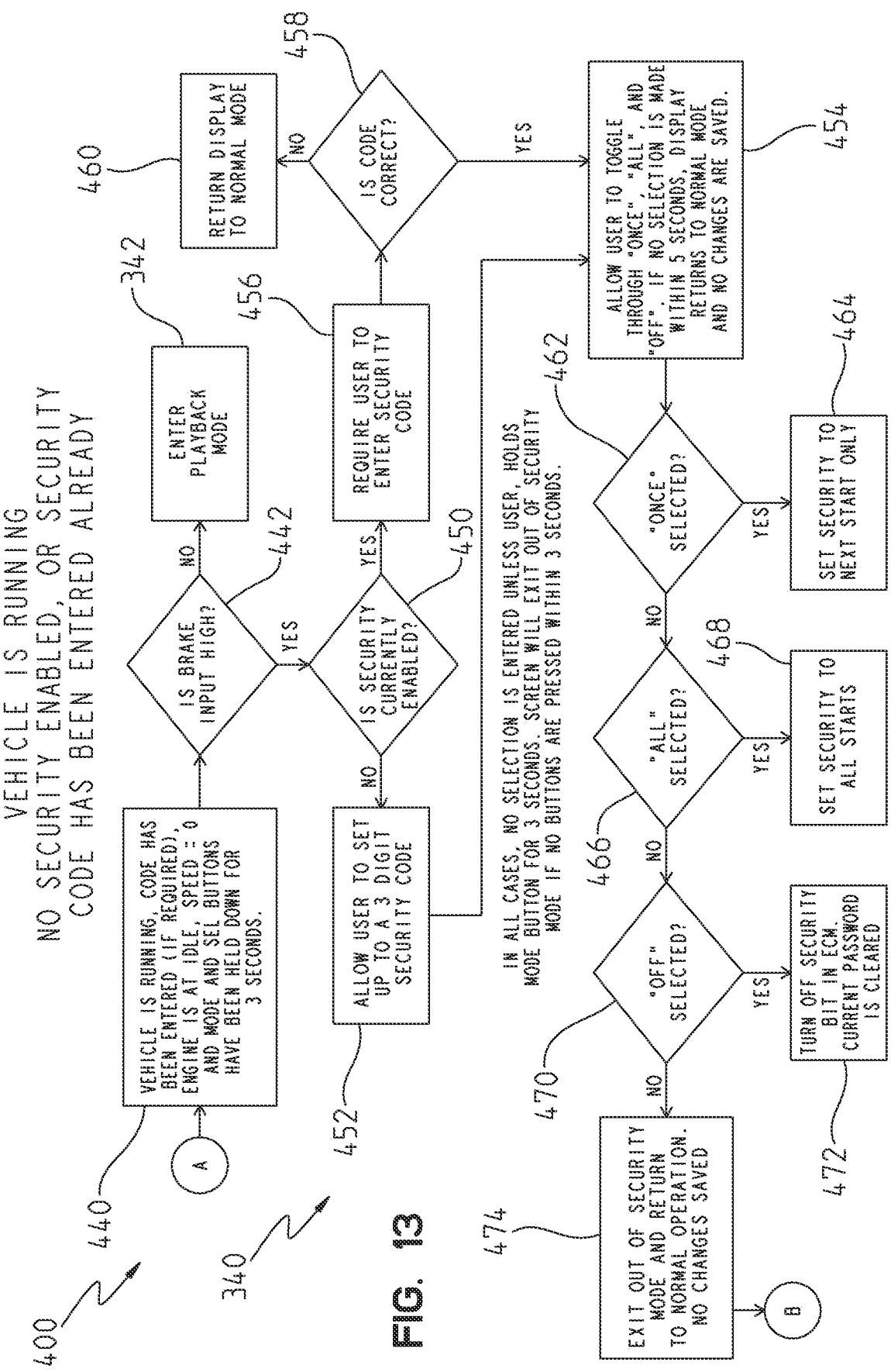

An exemplary implementation of security mode of operation 340 is described in connection with FIGS. 12 and 13 which illustrate a processing sequence 400 for controller 140 or interface controller 151. Referring to FIG. 12, snowmobile 250 is started, as represented by block 402. A check is made to see if a security mode (356, 358) is active or not, as represented by block 404. If a security mode is not active, snowmobile 250 is allowed full functionality, as represented by block 406.

If a security mode is active, the operator is prompted to enter the security code, as represented by block 408. The operator is given a predetermined period of time, such as thirty seconds, to enter the security code before prime mover 112 is shut-off.

In one embodiment, the security code is entered with MODE button 1210 and SEL button 1212, as follows. To enable one of the secure modes, the operator will press and hold the MODE button 310 and SEL button 312 on the display 304 for a predetermined time period, such as 3 seconds while the brake is in a locked or set position. In one example, the vehicle 100 must be running with an engine RPM of 3500 or less, a ground speed of 0, and the brake input being high to set or change security modes.

In one embodiment, the security code is entered through instrument cluster 302 as follows. When the operator presses and holds MODE button 310 and SEL button 312 for the predetermined time, the display 304 changes from normal display mode wherein a tachometer reading and a speed reading are displayed to a security set mode. In the security set mode, the left most digit 364 of display 304 becomes active and displays a "0" which blinks at a rate of 2 HZ. The operator releases MODE button 310 and SEL button 312. Subsequent pressing and releasing of SEL button 312 increments the active digit by 1 for each press and release cycle. Pressing MODE button 310 accepts the value for the left digit and moves the cursor to the middle digit 366. The left digit 364 will no longer blink, but the middle digit 366 will now blink. Subsequent pressing and releasing of SEL button 312 increments the active digit by 1 for each press and release cycle. Pressing MODE button 310 accepts the value for the middle digit 366 and moves the cursor to the right digit 368. The left digit 364 and the middle digit 366 will no longer blink, but the right digit 368 will now blink. Subsequent pressing and releasing of SEL button 312 increments the active digit by 1 for each press and release cycle. Pressing MODE button 310 accepts the value for the right digit 368.

Pressing MODE button 310 again will set cursor back on left most digit 364, holding MODE button 310 for a predetermined time period, such as 3 seconds, will bring up the "ONCE" or "ALL" selection. Display 304 first includes the text "ONCE". Pressing and holding MODE button 310 for a predetermined time, such as 3 seconds will select the secure once security mode 356 wherein the security code is required only for the next start of snowmobile 250. Pressing SEL button 312 toggles display 304 to show the text "ALL". Pressing and holding MODE button 310 for a predetermined time, such as 3 seconds will select the secure all security mode 358 wherein the security code is required for each subsequent start of snowmobile 250. Once one of the secure once security mode of operation 356 and the secure all security mode of operation 358 has been selected, the entered code is displayed on the top segment line of display 304, "ONCE" or "ALL" on the middle segment line, and "CODE" on the bottom segment line. The code will flash for a predetermined time period, such as 3 seconds. The code and security mode will then be written to the memory 142 or memory 153 associated with controller 140 or interface controller 151 and display 304 will return to normal function. At anytime in the process, if no buttons are pressed for 5 seconds, controller 140 or interface controller 151 will exit the security mode and return display 304 to the normal display mode and no security code will be set.

In the illustrated embodiment, the security code is a manually entered numeric code. Other exemplary security codes include manually entered alpha-numeric codes, biometric information provided to a reader, electromagnetic signals including security code information provided to a receiver, and other suitable methods of presenting a security code.

Returning to FIG. 12, when the operator enters a code to deactivate the security mode of operation a check is made by controller 140 or interface controller 151 to determine if the code entered matches the code stored in the memory 142 or memory 153 associated with controller 140 or interface controller 151, as represented by block 410. If the entered code does not match the code stored in the memory 142 associated with controller 140 or interface controller 151, display 304 will show "Secure" "Err", as represented by block 412. A check is made to see if the thirty second window has expired, as represented by block 414. If not, the operator is given another chance to enter a security code, as represented by block 408.

If the thirty second window has expired, in one embodiment, snowmobile 250 is shut off, as represented by block 416. In another embodiment, even if the thirty second window has expired, snowmobile 250 is not shut off if the engine temperature is below a predetermined warm-up temperature, as represented by block 418. If the engine temperature is below the predetermined warm-up temperature then the operator is still given time to enter the security code, as represented by block 408. If the engine temperature is equal to or above the predetermined warm-up temperature and a valid security code still has not been entered, snowmobile 250 is shut off. By basing the shut off on engine temperature, an operator may start snowmobile 250 and be spaced apart from snowmobile 250 with confidence that snowmobile 250 will not be stolen or used in an unauthorized manner and that it will be ready operate (warmed-up) when the operator returns. In one example, the thirty second timer is restarted when the predetermined engine temperature has been met.

If the entered code matches the code stored in memory 142 or memory 153 associated with controller 140 or interface controller 151, a check is made to determine if the security mode was "ONCE" or "ALL", as represented by block 430. If the security mode was set to "ALL" then snowmobile 250 is allowed full functionality, as represented by block 406. The operator will need to enter a security code at the next start-up of snowmobile 250, the security code being retained in memory 142 or memory 153. If the security mode was set to "ONCE" then the security mode is disabled, as represented by block 432, meaning that the operator will not need to enter a security code at the next start-up of snowmobile 250. In one embodiment, the security code is cleared when security is turned OFF in the "ONCE" security mode. Display 304 will toggle to show "Secure" "OFF".

When the engine is at idle, the track speed is zero, an operator may enter a security or playback setup, as represented by block 440. Controller 140 or interface controller 151 checks the status of the brake input, as represented by block 442. If the brake input is low then playback mode of operation 342 is entered. If brake input is high then security mode of operation 340 is entered.

In security mode of operation 340, a check is made to see if a security mode (356, 358) is currently active, as represented by block 450. If a security mode is not currently active, an operator may enter a three digit security code as outlined herein, as represented by block 452. Once the code has been entered, the operator is presented options for the security system, as represented by block 454. Returning to block 450, if a security mode is currently active, the operator is required to enter the security code, as represented by block 456. A check is made to see if the entered code matches the stored code, as represented by block 458. If the code does not match the stored code, display 304 is returned to normal display, as represented by block 460. If the code matches the stored code, the operator is presented options for the security system, as represented by block 454.

The operator is able to toggle through various options for the security system. A first option is to set the security mode to secure once security mode of operation 356, as represented by blocks 462 and 464. A second option is to set the security mode to secure all security mode of operation 358, as represented by blocks 466 and 468. A third option is to turn the security mode to "OFF", as represented by blocks 470 and 472. If none of the three options are selected or a predetermined time period, such as five seconds, passes without further input controller 140 or interface controller 151 will exit processing sequence 340 and no changes will be saved, as represented by block 474.

In one embodiment, multiple security codes may be set. The security codes may be used to operate snowmobile 250 in various modes. In this embodiment, the security codes are not cleared unless instructed by the operator. An owner may want to alter the performance characteristics of snowmobile 250 based on the operator of 250. For instance, a parent may want full operation of snowmobile 250 for himself or herself, while wanting to limit the top speed of snowmobile 250 for a child. Also, an owner may want to vary the performance characteristics based on the intended use of snowmobile 250. Exemplary uses include a first code may be used for a novice mode of operation of snowmobile 250, a second code may be used for a cruise mode of operation of snowmobile 250, a third code may be used for an expert mode of operation of snowmobile 250, and a fourth code may be used for normal operation of snowmobile 250. In the novice mode the acceleration and top speed of snowmobile 250 is limited. In the cruise mode the acceleration of snowmobile 250 is optimized for fuel economy. In the expert mode the acceleration and top speed and other parameters, such as braking, of snowmobile 250 are optimized for an expert rider.

Figure 18:
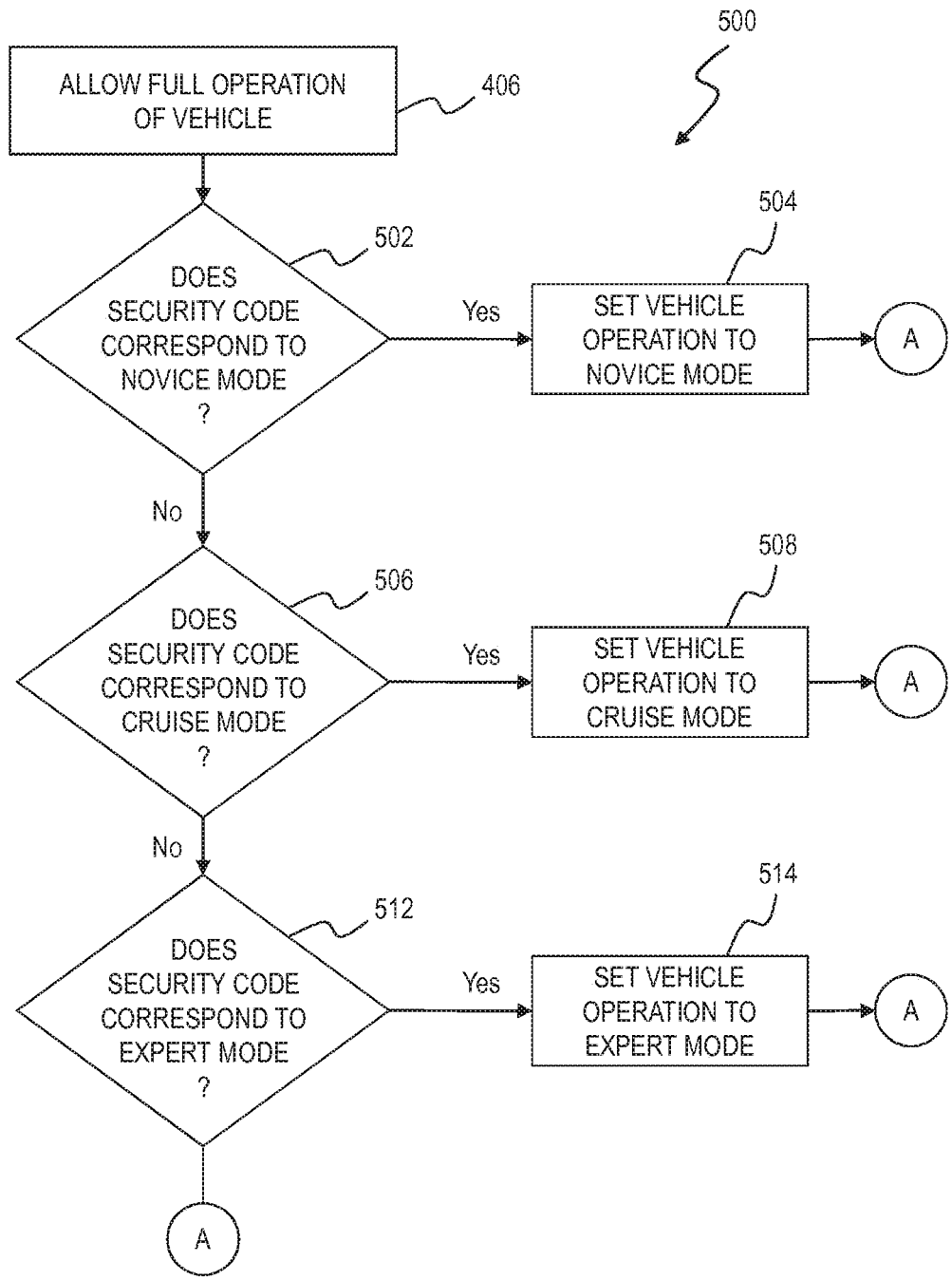
FIG. 18 illustrates a processing sequence for multiple security codes corresponding to different vehicle modes of operation.

One embodiment of a processing sequence 500 of controller 140 or interface controller 151 for handling multiple security codes is shown in FIG. 18. Processing sequence 500 is inserted into processing sequence 400 between block 406 and block 440. Subsequent to block 406, controller 140 or interface controller 151 determines if the entered security code corresponds to a novice mode of operation of snowmobile 250, as represented by block 502. In one example, any security code having a "1" as the right digit causes snowmobile 250 to operate in the novice mode of operation. If so, controller 140 or interface controller 151 sets the performance of snowmobile 250 to correspond to a novice mode of operation, as represented by block 504, and proceeds to block 440. In the novice mode of operation, the RPM of vehicle 100 is limited or the vehicle speed is limited. In one embodiment, the vehicle speed is limited to be less than about 15 miles per hour.

If not, controller 140 or interface controller 151 determines if the entered security code corresponds to a cruise mode of operation of snowmobile 250, as represented by block 506. In one example, any security code having a "2" as the right digit causes snowmobile 250 to operate in the cruise mode. If so, controller 140 or interface controller 151 sets the performance of snowmobile 250 to correspond to a cruise mode of operation, as represented by block 508, and proceeds to block 440. In one embodiment of the cruise mode of operation, the acceleration rate of the engine and the vehicle speed is limited. In one embodiment of the cruise mode of operation, the acceleration rate of the engine is limited. In one embodiment of the cruise mode of operation, the vehicle speed is limited.

If not, controller 140 or interface controller 151 determines if the entered security code corresponds to an expert mode of operation of snowmobile 250, as represented by block 512. In one example, any security code having a "3" as the right digit causes snowmobile 250 to operate in the expert mode. If so, controller 140 or interface controller 151 sets the performance of snowmobile 250 to correspond to an expert mode of operation, as represented by block 514, and proceeds to block 440. In the expert mode of operation, some engine durability safe guards are lessened compared to the normal mode of operation so as to not limit vehicle performance in severe conditions such as racing. In one embodiment, a different timing curve is implemented.

If not, controller 140 or interface controller 151 sets snowmobile 250 to operate in a normal mode of operation. In one example, any security code having a "4"-"0" as the right digit causes snowmobile 250 to operate in the normal mode of operation.

As mentioned herein, controller 140 or interface controller 151 may execute a processing sequence for a playback mode of operation 342. In playback mode of operation 342, controller 140 or interface controller 151 stores in memory 142 or memory 153 vehicle speed, throttle position, and tachometer readings for potential playback to the operator with display 304 when snowmobile 250 is idling at zero speed. In one embodiment, or memory 153 of or interface controller 151 or memory 142 of controller 140 also records associated navigation data, such as GPS data, with the speed, throttle position, and tachometer readings.

In one embodiment, navigation module 180 is a GPS module which provides GPS information over the CAN network. In one embodiment, portable memory device 200 includes a GPS module. In this situation, portable memory device 200 is connected to vehicle 100 during the ride and either stores GPS data in memory 214 or provides GPS date to vehicle 100 over the CAN network. In one embodiment, a stand alone GPS device may be used. In this situation, the data collected by vehicle 100 is synced with the GPS data by the operator. This may be done when the user is loading the information to their account in the playback database. In one example, the data collected by vehicle 100 is time-stamped to assist in syncing with external data, such as the GPS data. In one embodiment, wherein the navigation data is provided by navigation module 180, the controller 140 or interface controller 151 time stamps all of the collected data.

In one embodiment, the playback mode of operation is used as a "clutching tool" to assist in tuning the performance of vehicle 100. Various data, including vehicle speed, engine rpm data, and throttle position data are stored in memory 142 or or memory 153. By examining this data the operator may adjust the weights and springs of the CVT to tune the clutch. In one embodiment, this information is displayed on LCD segmented display 304. In one example, LCD segmented display 304 is a segmented LCD display, and the information is presented as numbers replaying the value for the stored data. In one example, the output device is a monitor and the information is presented in a graphical format. Exemplary graphical formats include histograms. An exemplary histogram is the percentage of time the throttle is at each throttle position. Another exemplary histogram is the percentage of time the engine is at each rpm value or range of values. Another exemplary graphical format is a time plot independently graphing the change of throttle position, engine rpm, and ground speed as a function of time.

Figure 19:
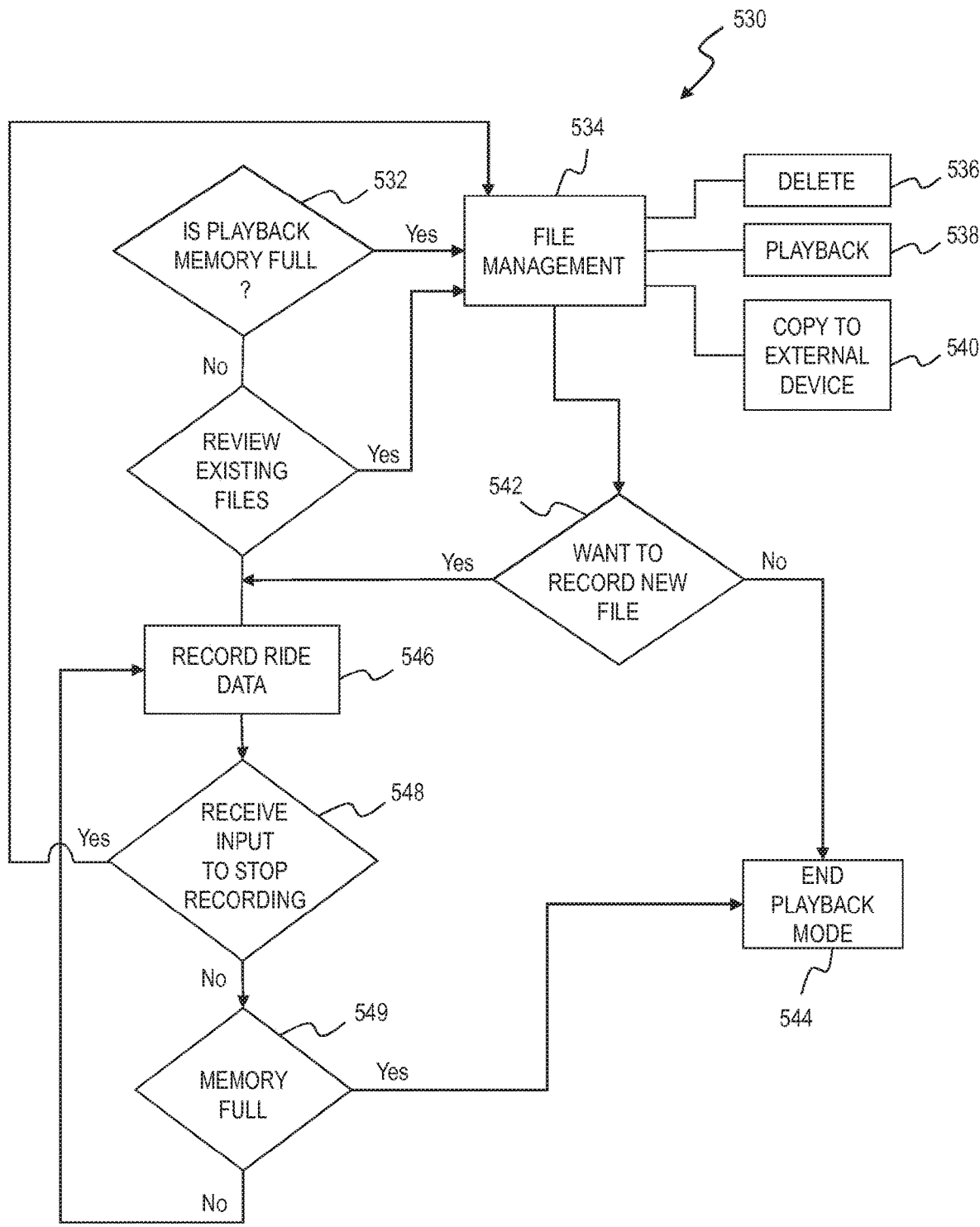
FIG. 19 illustrates a processing sequence of the controller of the vehicle in FIG. 1 for the playback mode.

Referring to FIG. 19, an exemplary processing sequence 530 is provided. Controller 140 or interface controller 151 checks to see if memory 142 or memory 153 is full. If so, the operator is able to perform file management, as represented by block 534. Exemplary file management options are to delete one or more existing files, as represented by block 536, to playback an existing file through display 304, as represented by block 538, and to copy one or more existing files to an external device, as represented by block 540. Selections for file management operations are made through instrument cluster 302. In one embodiment, by pressing both MODE button 310 and SEL button 312 for a predetermined period of time, the operator initiates a playback of the selected stored data.

If one or more files have been deleted to provide space on memory 142 or memory 153, the operator is queried through instrument cluster 302 whether they want to record a new file, as represented by block 542. If not, playback mode ends as represented by block 544. If yes, controller 140 or interface controller 151 records subsequent ride data, as represented by block 546. In one embodiment, controller 140 or interface controller 151 does not start recording ride data until vehicle speed is greater than zero. Returning to block 532, if memory 142 or memory 153 is not full the operator is given the choice between file management, as represented by block 534, and recording ride data, as represented by block 546.

The recording of ride data (speed, tachometer readings, throttle position, and/or navigation data) continues until the operator provides an input to stop through operator interface 300, as represented by block 548, or memory 142 or memory 153 is full, as represented by block 549. Portable memory may be connected to vehicle 100 during rides to provide additional memory capacity. In one embodiment, by pressing both MODE button 310 and SEL button 312 for a predetermined period of time, the operator provides an input to stop recording. Exemplary information that may be recorded as ride data includes vehicle speed, vehicle acceleration, tachometer readings, fuel economy, average vehicle speed, maximum vehicle speed, number of braking instances, navigation data, time, ambient temperature, engine temperature, and combinations thereof. A review of the recorded ride data is helpful in tuning the snowmobile 250, such as the tuning of CVT 120.

Figure 21:
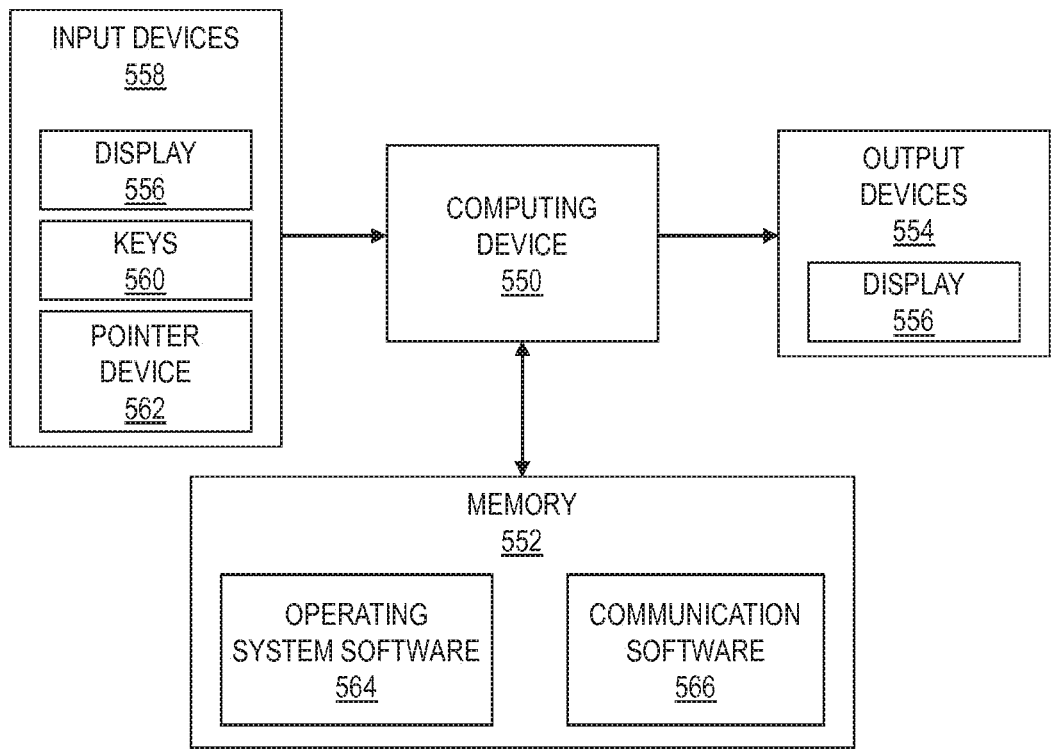
FIG. 21 illustrates a representative view of a computing device of FIG. 20.

Returning to block 540, in one embodiment, the operator copies the recorded files to portable memory device 200. These files may then be uploaded to a personal computing device 550, as represented in FIG. 21. Computing device 550 may be a general purpose computer or a portable computing device. Exemplary computing devices include desktop computers, laptop computers, personal data assistants ("PDA"), such as BLACKBERRY brand devices, cellular devices, tablet computers, or other devices capable of the communications discussed herein. In one embodiment, portable memory device 200 is part of a personal computing device.

Computing device 550 has access to a memory 552. Memory 552 is a computer readable medium and may be a single storage device or multiple storage devices, located either locally with computing device 550 or accessible across a network. Computer-readable media may be any available media that can be accessed by the computing device 550 and includes both volatile and non-volatile media. Further, computer readable-media may be one or both of removable and non-removable media. By way of example, and not limitation, computer-readable media may comprise computer storage media. Exemplary computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store information and which can be accessed by the computing device 550.

Computing device 550 has access to one or more output devices 554. Exemplary output devices 554 include a display 556. Computing device 550 further has access to one or more input devices 558. Exemplary input devices 558 include a display 556 (such as a touch display), keys 560 (such as a keypad or keyboard), a pointer device 562 (such as a mouse, a roller ball, a stylus), and other suitable devices by which an operator may provide input to computing device 550.

Memory 552 includes an operating system software 564. An exemplary operating system software is a WINDOWS operating system available from Microsoft Corporation of Redmond, Wash. An exemplary operating system for mobile devices is the iPhone operating system available from Apple Corporation of Cupertino, Calif. Memory 552 further includes communications software 566. Exemplary communications software 566 includes e-mail software, internet browser software, and other types of software which permit computing device 550 to communicate with other computing devices across a network 570. Exemplary networks include a local area network, a cellular network, a public switched network, and other suitable networks. An exemplary public switched network is the Internet. In one embodiment, controller 140 or interface controller 151 of snowmobile 250 has access to network 570 and is able to send information to computing device 550 through network 570 instead of through portable memory device 200.

Figure 20:
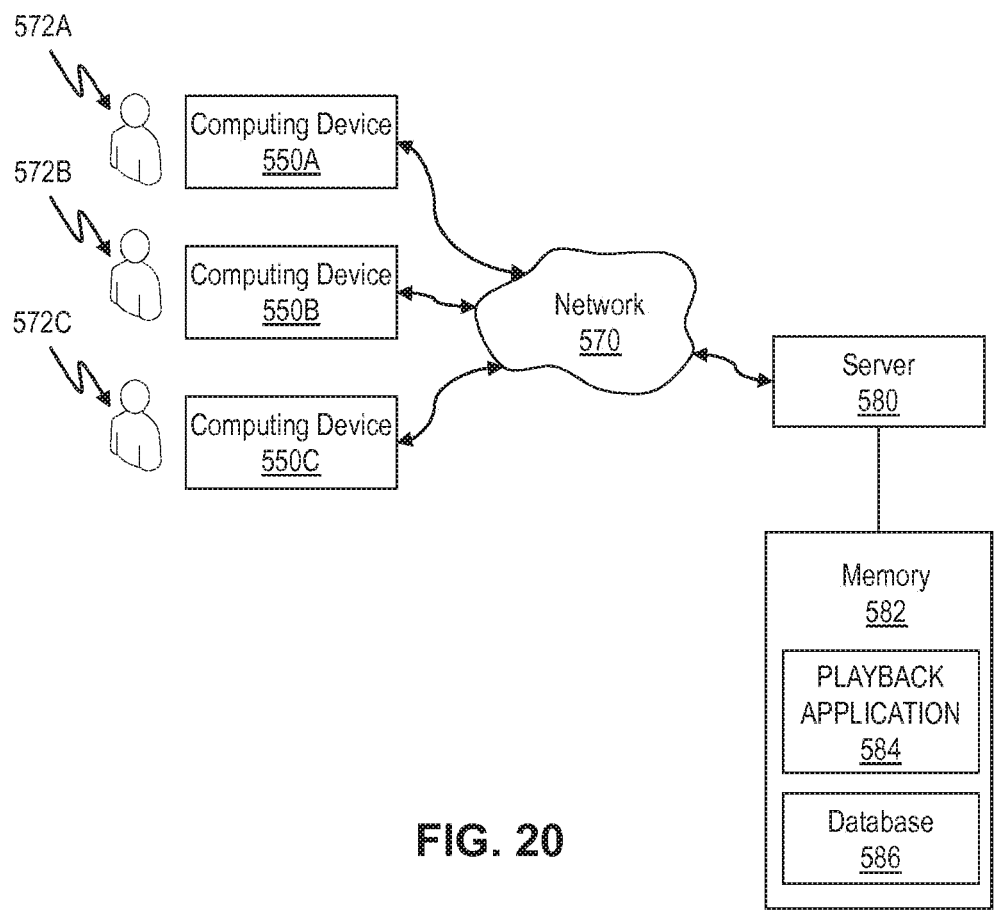
FIG. 20 illustrates a plurality of users interacting with a server over a network to interact with a playback application.

Referring to FIG. 20, a plurality of operators 572A-C are represented. Each of operators 572 owns or has access to a snowmobile 250. In FIG. 20, each of operators 572 are shown with an associated computing device 550. Of course, a given operator 572 may have multiple computing devices 550 by which the member may access to a computing device 580 through a network 570. Although a single network 570 is shown, network 570 may be comprised of multiple networks which each have the ability to access computing device 580. For example, some of computing devices 550 may be handheld devices which communicate with computing device 580 through a cellular network while other computing devices 550 are computers which communicate with computing device 580 through a public switched network, such as the Internet. In one example, computing devices 550 having access to the cellular network also communicate with computing device 580 through the Internet, in that the provider of cellular service provides a connection to the Internet.

Computing device 580 is labelled as Server because it serves or otherwise makes available to computing devices 550 various playback applications 584. In one embodiment, computing device 580 is a web server and the various playback applications 584 include web sites which are served by computing device 580. Although a single server is shown, it is understood that multiple computing devices may be implemented to function as computing device 580.

Computing device 580 has access to a memory 582. Memory 582 is a computer readable medium and may be a single storage device or multiple storage devices, located either locally with computing device 580 or accessible across a network. Computer-readable media may be any available media that can be accessed by the computing device 580 and includes both volatile and non-volatile media. Further, computer readable-media may be one or both of removable and non-removable media. By way of example, and not limitation, computer-readable media may comprise computer storage media. Exemplary computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store information and which can be accessed by the computing device 580.

Figure 22:
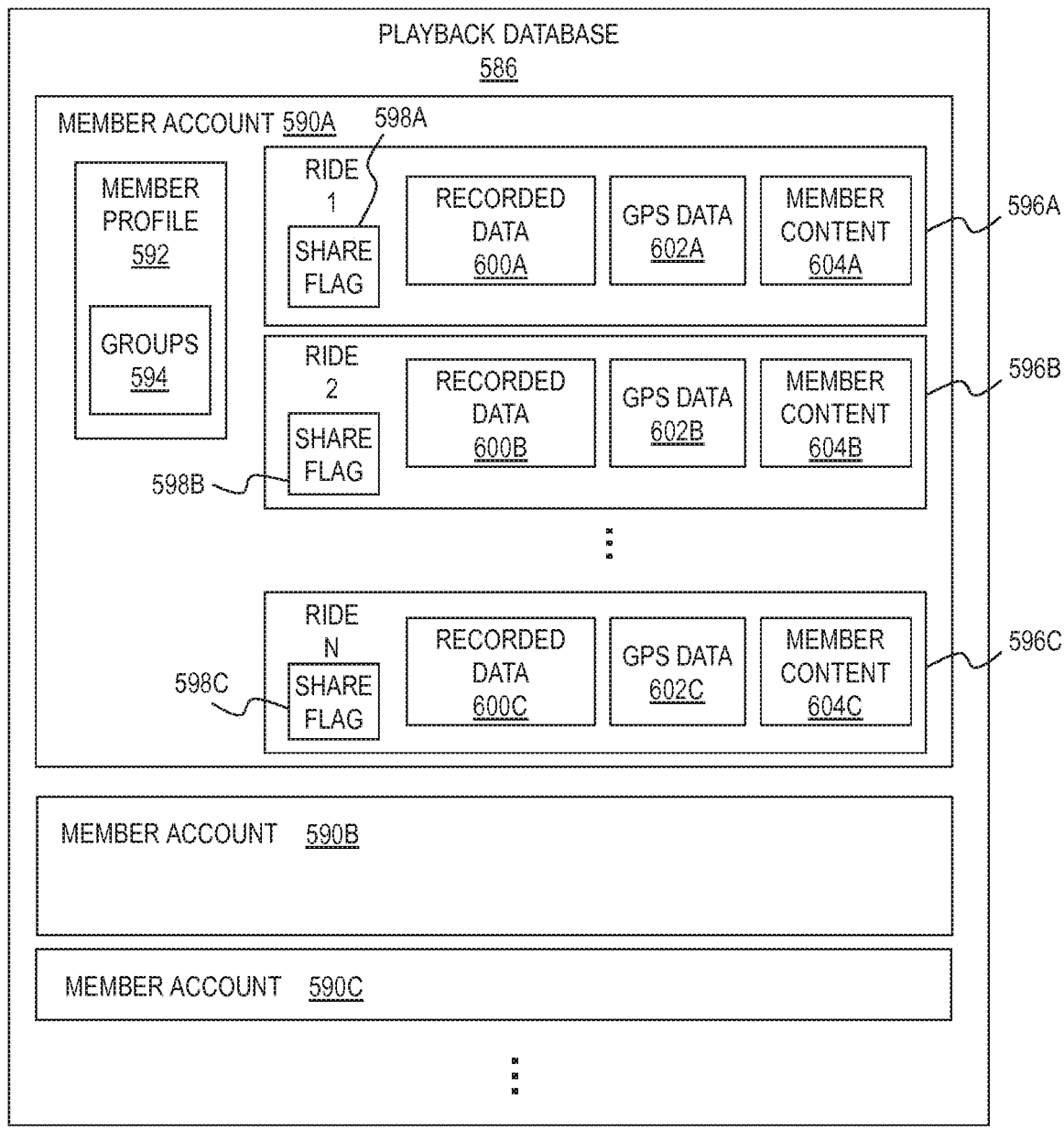
FIG. 22 illustrates a representative view of a playback database associated with the playback application of FIG. 20.

The playback applications 584 are stored on memory 582. In addition, memory 582 stores one or more databases 586 which are used by the playback applications 584. Referring to FIG. 22, an exemplary playback database 586 is shown. Each of operators 572A-C has an associated member account 590A-C.

Referring to member account 590A, the operator is provided with a member profile 592. Member profile 592A includes information about the member and about the vehicle of the member. In addition, member profile 592A may include a listing of groups 594, such as riding clubs, of which the operator 572A is a member. In addition, member account 590A may have a plurality of rides, illustratively rides 596A-C, that include corresponding recorded data 600A-C from the playback mode of operation of snowmobile 250 including navigation data 602A-C. Further, the operator may load additional member content 604A-C to be associated with the respective rides 596A-C. Exemplary member content includes pictures, video, descriptive text, maps, and other suitable types of content.

As shown in FIG. 22, each ride 596A-C has a respective share flag 598A-C which is associated with the ride. With different values of the share flag, a member make mark their ride data as private (only they have access), open to group (members of a ride club or other group have access), or public (every member has access). By having this ability to post and search ride data, operators 572 may get a feel for the experiences of other operators 572.

Figure 23:
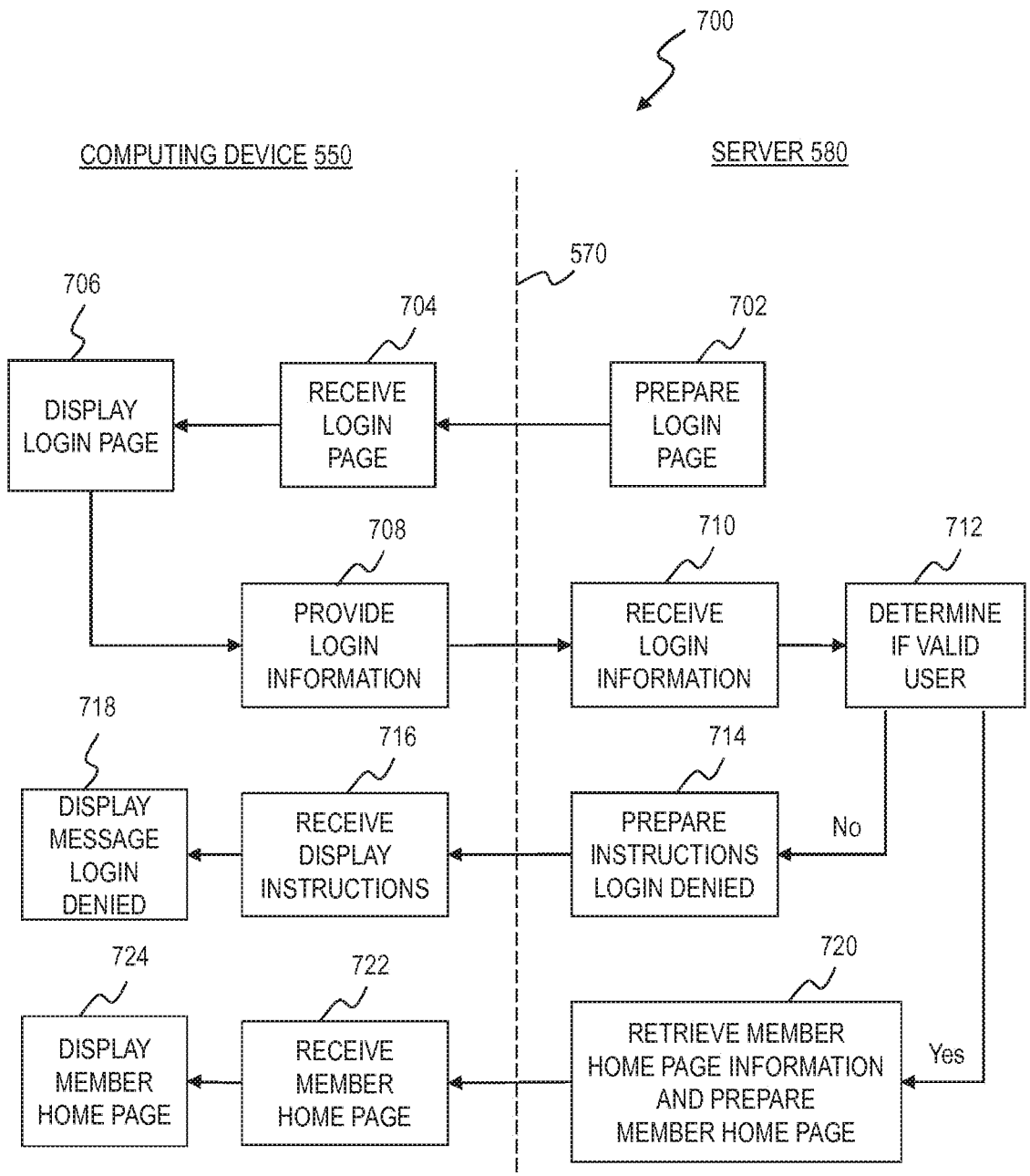
FIG. 23 illustrates a login processing sequence of the playback application of FIG. 20.

Referring to FIG. 23, a processing sequence 700 for logging a member into playback applications 584 is shown. Server 580 prepares a login page for viewing in a web browser of computing device 550, as represented by block 702. This login page is forwarded to computing device 550 over network 570 and is received by computing device 550, as represented by block 704. The computing device 550 displays the login page, as represented by block 706. The operator through the login page provides login information, as represented by block 708. This information is provided to computing device 580, as represented by block 710. Server 580 determines if the login information is correct or not, as represented by block 712. If the login information is incorrect, a new web page stating that the login was incorrect is prepared and sent to computing device 550, as represented by blocks 714, 716, and 718. If the login information was correct, then information stored in databases 586 regarding the member's home page is retrieved and a home web page for the member is prepared and provided to computing device 550, as represented by blocks 720, 722, and 724.

Figure 24:
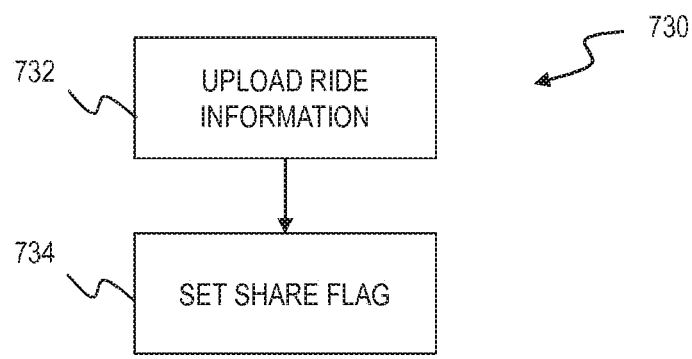
FIG. 24 illustrates an upload processing sequence of the playback application of FIG. 20.

Referring to FIG. 24, a processing sequence 730 is provided for adding ride information to databases 586. Server 580 receives and stores in database 586 the ride information 600 (and any associated GPS data 602 and member content 604), as represented by block 732. Server 580 also receives and stores the share flag associated with the ride information 600, as represented by block 734.

Figure 25:
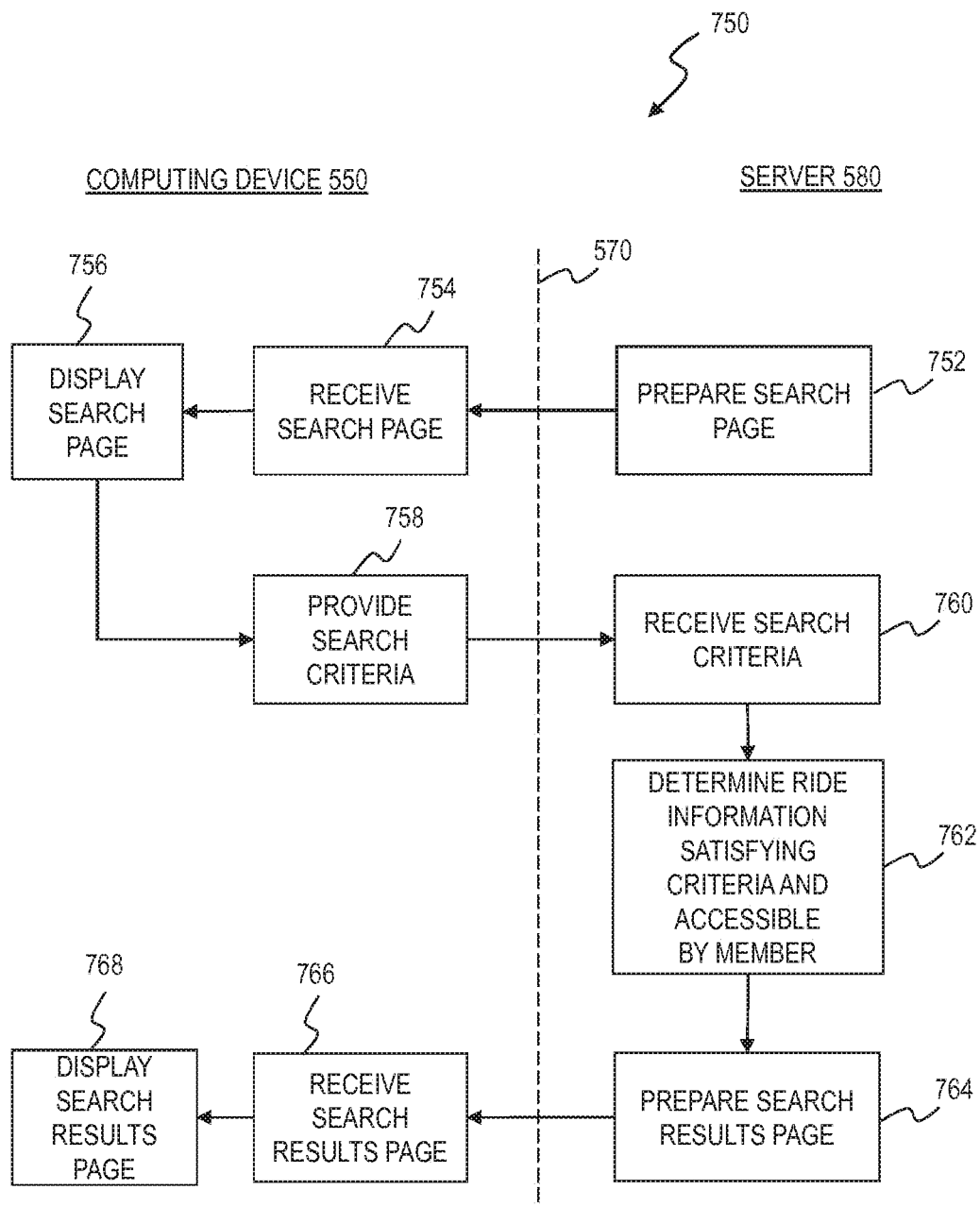
FIG. 25 illustrates a search processing sequence of the playback application of FIG. 20.

Referring to FIG. 25, a processing sequence 750 for conducting a search of ride data stored in playback applications 584 is shown. Server 580 prepares a search page for viewing in a web browser of computing device 550, as represented by block 752. This search page is forwarded to computing device 550 over network 570 and is received by computing device 550, as represented by block 754. The computing device 550 displays the search page, as represented by block 756. The operator through the search page provides search criteria, as represented by block 758. One exemplary search would be for all ride data for a given trail. This search criteria is provided to computing device 580, as represented by block 760. Server 580 determines ride information satisfying the search criteria which is accessible by the member based on the share flag, as represented by block 762. Server 580 prepares and provides a search results web page for viewing on the display of computing device 550, as represented by blocks 764, 766, and 768.

Figure 26:
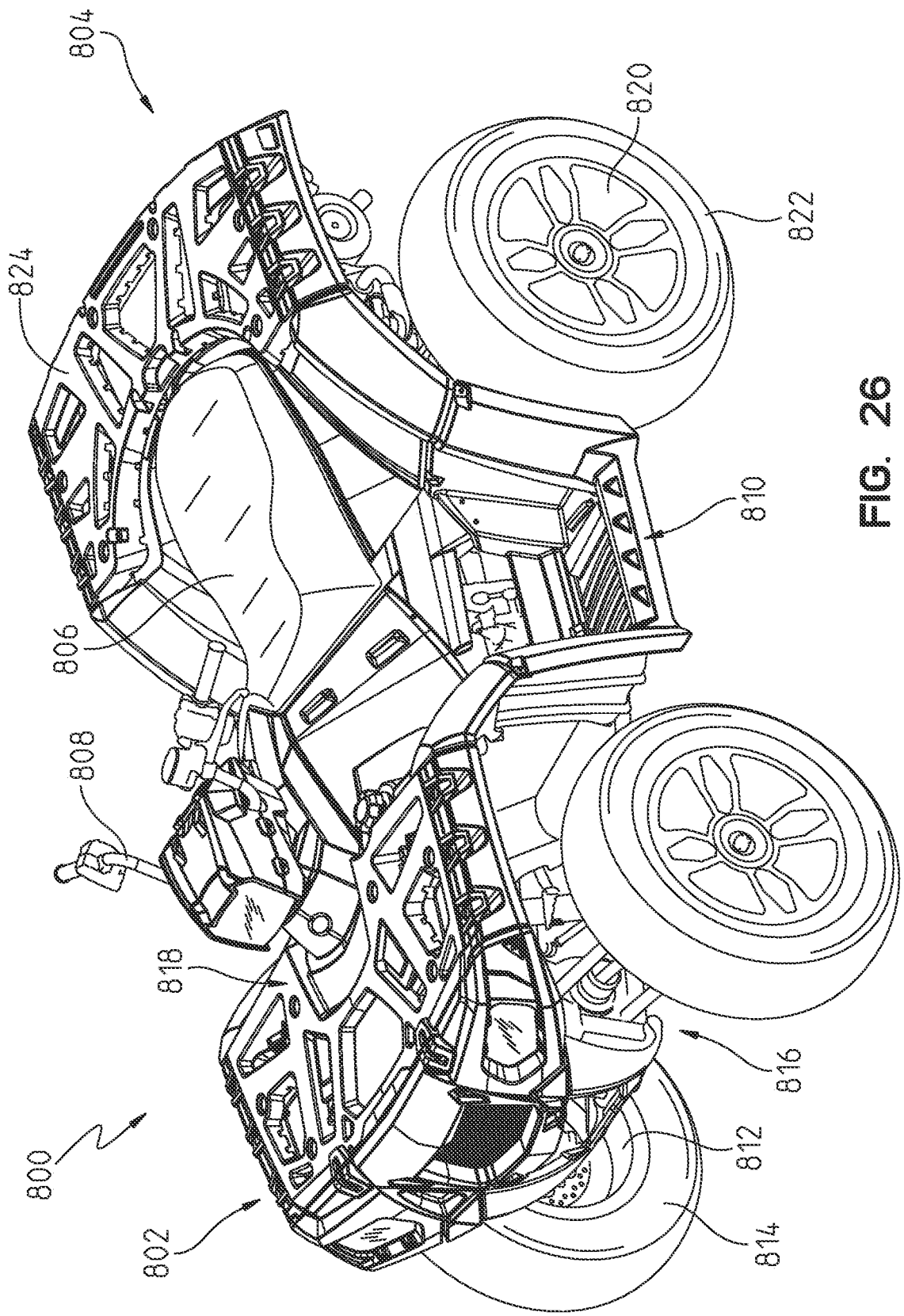
FIG. 26 illustrates a front, left, perspective view of an exemplary ATV.

As stated herein, security mode of operation 340 and playback mode of operation 342 may used on various types of vehicles 100. Referring to FIG. 26, one exemplary vehicle, an ATV 800, is shown. ATV 800 includes front end 802, rear end 804, straddle-type seat 806, and handlebar assembly 808. Front end 802 and rear end 804 are separated by footwells 810 on both lateral sides of ATV 800 and separated by seat 806. Front end 802 is supported by front wheels 812 and tires 814 and front suspension 816. Front end 802 also includes front panel 818 which may include a tool storage compartment. Handlebar assembly 808 is operably coupled to front wheels 812 to allow an operator to steer ATV 800 when supported by seat 806 and/or footwells 810. Rear end 804 is supported by rear wheels 820, tires 822 and a rear suspension (not shown). Rear end 804 also includes rear panel 824 which may include a tool storage compartment. Front panel 818 and rear panel 824 may also include an accessory coupling system such as the one disclosed in U.S. Pat. No. 7,055,454, the disclosure of which is expressly incorporated by reference herein. Additional details regarding exemplary ATV vehicles are provided in U.S. patent application Ser. No. 12/069,511, U.S. patent application Ser. No. 12/069,515, U.S. patent application Ser. No. 12/069,521, and U.S. patent application Ser. No. 12/272, 377, the disclosures of which are expressly incorporated by reference herein.

Figure 27:
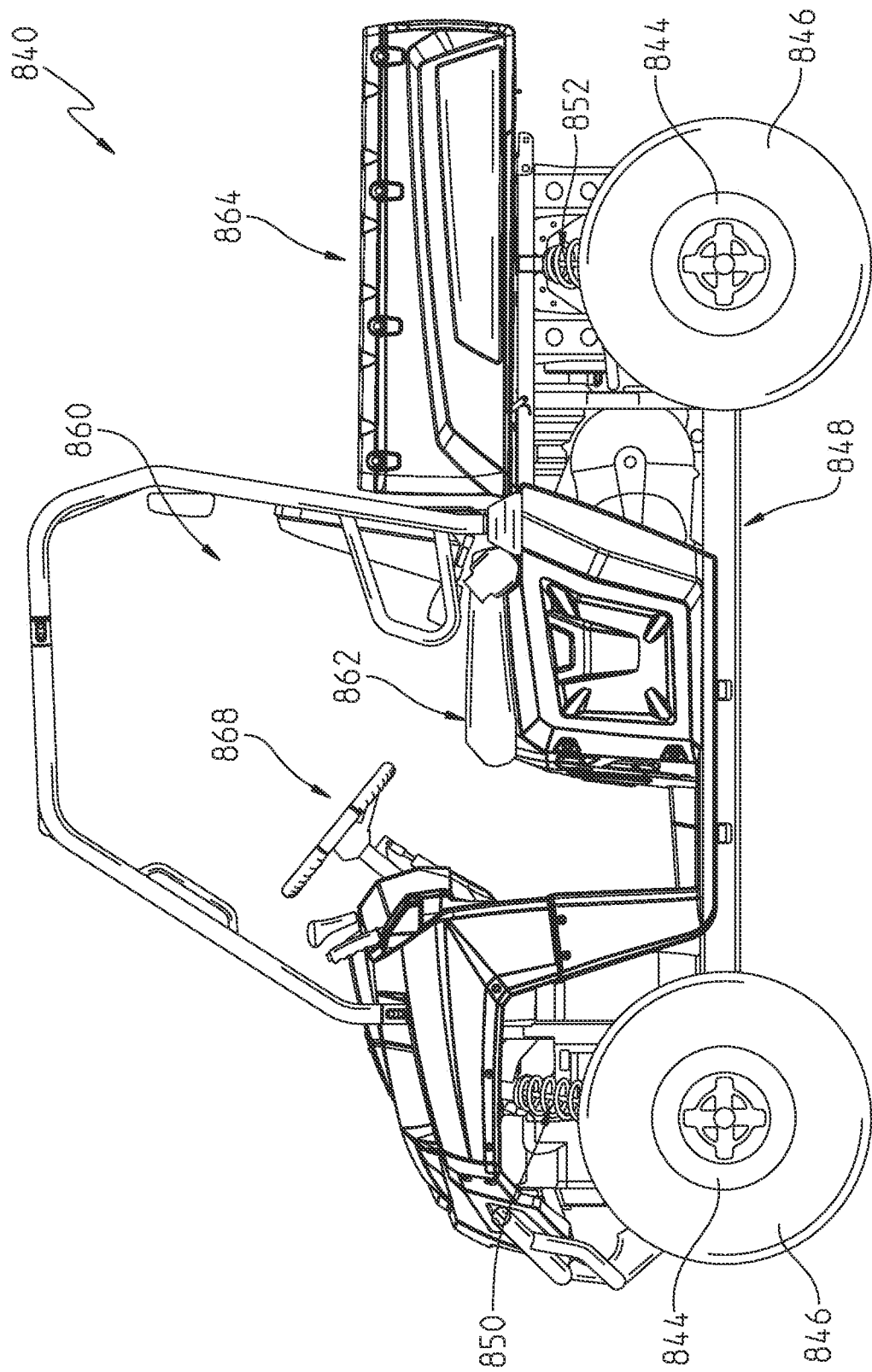
FIG. 27 illustrates a left, side view of an exemplary utility vehicle.

Referring to FIG. 27, another exemplary vehicle, a utility vehicle 840, is shown. Utility vehicle 840, as illustrated, includes a plurality of wheels 844 and associated tires 846 which support a frame 848 through respective front suspensions 850 and rear suspensions 852. Utility vehicle 840 includes an operator area 860 having side-by-side seating and a cargo bed 862. Further, an operator may steer the front wheels 844 through steering wheel 868. Additional details regarding exemplary utility vehicles are provided in U.S. patent application Ser. No. 12/317,298, U.S. patent application Ser. No. 12/218,572, U.S. patent application Ser. No. 12/092,191, U.S. patent application Ser. No. 12/092,153, U.S. patent application Ser. No. 12/092,151, U.S. patent application Ser. No. 12/050,064, U.S. patent application Ser. No. 12/050,048, and U.S. patent application Ser. No. 12/050, 041, the disclosures of which are expressly incorporated by reference herein.

Figure 28:
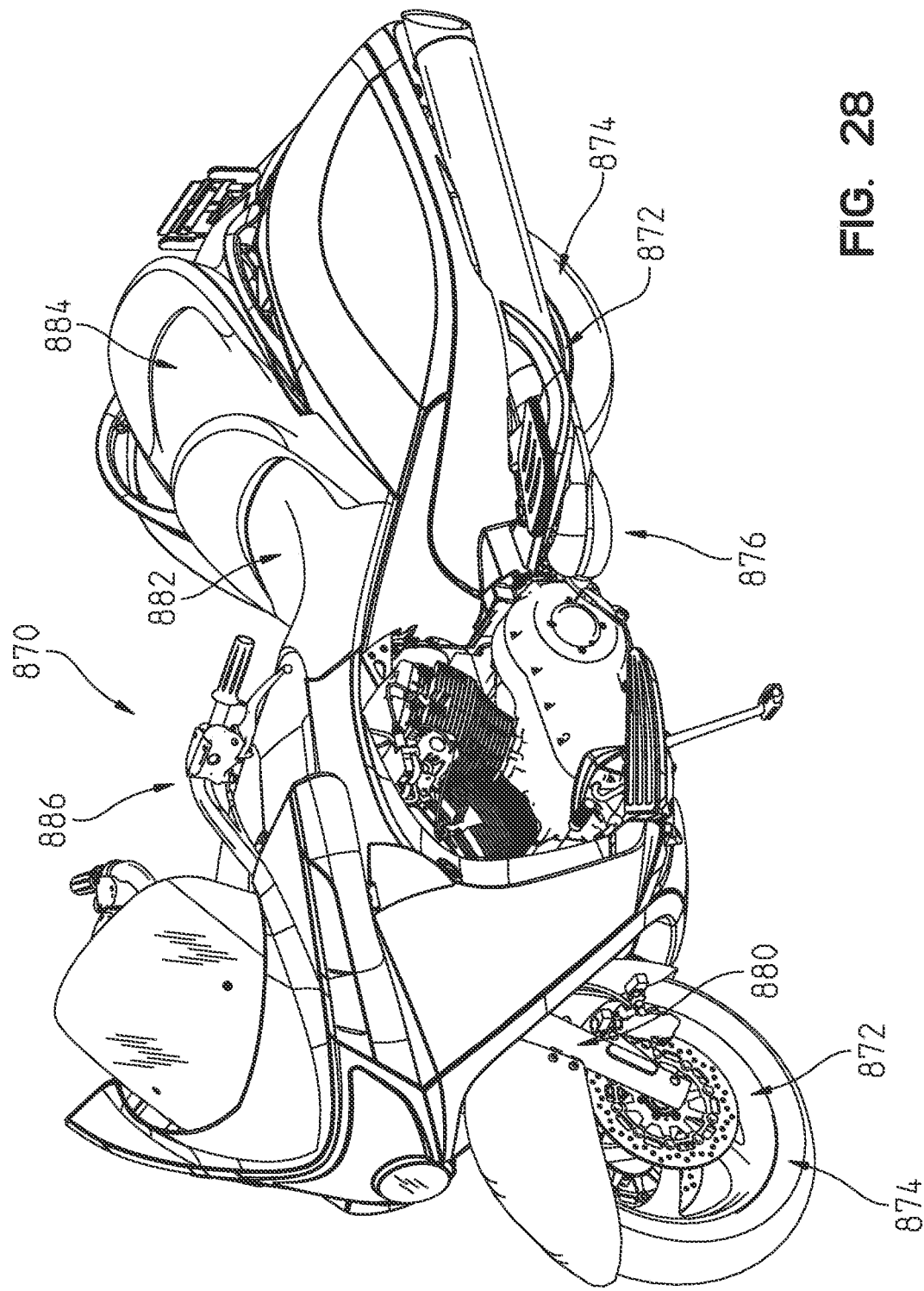
FIG. 28 illustrates a front, left, perspective view of an exemplary motorcycle.

Referring to FIG. 28, another exemplary vehicle, a motorcycle 870, is shown. Motorcycle 870, as illustrated, includes a plurality of wheels 872 and associated tires 874 which support a frame 876 through respective front suspension 880 and rear suspension (not shown). The front and rear wheels of motorcycle 870 are in line. Motorcycle 870 includes an operator seat area 882 and a passenger seat area 884. Further, an operator may steer the front wheel 872 through handlebars 886. Additional details regarding exemplary motorcycles are provided in U.S. patent application Ser. No. 12/015,435, U.S. patent application Ser. No. 12/015,394, U.S. patent application Ser. No. 11/624,144, U.S. patent application Ser. No. 11/624,142, and U.S. patent application Ser. No. 11/624,103, the disclosures of which are expressly incorporated by reference herein.

Figure 29:
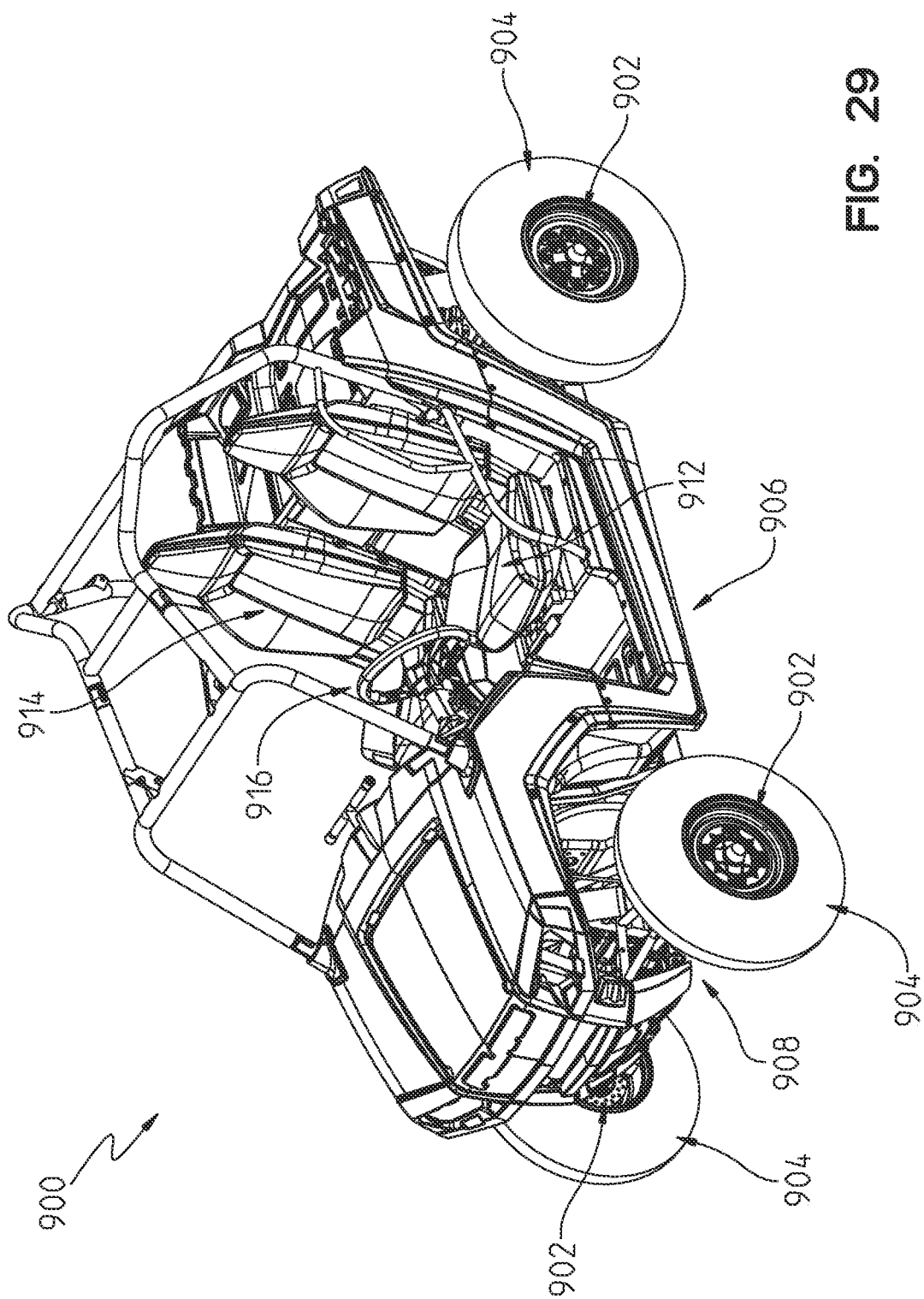
FIG. 29 illustrates a front, left perspective view of an exemplary side-by-side vehicle.

Referring to FIG. 29, another exemplary vehicle, a side-by-side vehicle 900, is shown. Vehicle 900, as illustrated, includes a plurality of wheels 902 and associated tires 904 which support a frame 906 through respective front suspension 908 and rear suspension (not shown). Vehicle 900 includes an operator seat area 912 and a passenger seat area 914. Further, an operator may steer the front wheels 902 through steering wheel 916. Additional details regarding exemplary side-by-side vehicles are provided in U.S. patent application Ser. No. 11/494,890 and U.S. patent application Ser. No. 11/494,891, the disclosures of which are expressly incorporated by reference herein.

While this invention has been described as having an exemplary design, the present invention may be further modified within the spirit and scope of this disclosure. Further, this application is intended to cover such departures from the present disclosure as come within known or customary practice in the art to which this invention pertains.

The invention claimed is:

1. A vehicle, comprising:
a plurality of ground engagement members;
a frame supported by the plurality of ground engagement members;
a power system supported by the frame and operatively coupled to at least one of the plurality of ground engagement members to power movement of the vehicle;
a steering system coupled to at least one of the ground engaging members to direct the vehicle;
an operator seat supported by the frame;
at least one vehicle sensor supported by the frame;
at least one memory supported by the frame during operation of the vehicle, the at least one memory configured to store data for the power system;

at least one user input device; and a controller operatively coupled to the power system to control an operation of the power system, the controller being operatively coupled to the at least one vehicle sensor to receive sensor data being stored on the at least one memory and being operatively coupled to the at least one user input device;

wherein operation of the power system is based on a security code input from the user input device to the controller that identifies one of a plurality of operation modes of the vehicle including at least a first mode defined by a first performance characteristic and a second mode defined by a second performance characteristic;

wherein the controller controls operation of the power system according to the security code input from the user input device when the security code matches a predetermined security code; and wherein the controller responds to the security code input from the user input device not matching the predetermined security code by controlling operation of the power system based upon a characteristic of the power system and a time period.

2. The vehicle of claim 1, wherein the at least one memory includes a first memory configured to store the data for the power system and a second memory configured to store the plurality of operation modes.

3. The vehicle of claim 1, further comprising a vehicle security control module configured to receive the security code from the user input device.

4. The vehicle of claim 3, wherein the security code enables the controller to adjust operation of the vehicle when the security code corresponds to one of the plurality of operation modes of the vehicle.

5. The vehicle of claim 4, wherein the plurality of operation modes is stored on the at least one memory.

6. The vehicle of claim 4, wherein the controller is configured to compare the security code with a plurality of security codes stored in the at least one memory, and initiate operation of the power system based on the security code.

7. The vehicle of claim 4, wherein each of the plurality of security codes stored in the at least one memory corresponds to at least one of the plurality of operation modes of the vehicle.

8. The vehicle of claim 4, wherein the security code includes a plurality of alphanumeric digits, and at least a first of the plurality of alphanumeric digits identifies one of the plurality of operation modes.

9. The vehicle of claim 4, wherein the security code includes a plurality of alphanumeric digits, and at least a last of the plurality of alphanumeric digits identifies one of the plurality of operation modes.

10. The vehicle of claim 1, wherein the first mode is defined by a first vehicle speed threshold and the second mode is defined by a second vehicle speed threshold greater than the first vehicle speed threshold.

11. The vehicle of claim 1, wherein, in the first mode, the controller adjusts at least one of: a vehicle speed and an engine speed of the vehicle.

12. The vehicle of claim 1, wherein, in the second mode, the controller adjusts at least one of: an acceleration rate of at least one of a vehicle speed and an engine speed of the vehicle or operation of the power system based on fuel economy parameters for the vehicle.

13. The vehicle of claim 1, wherein the first mode is a novice mode of operation of the vehicle.

14. The vehicle of claim 1, wherein the second mode is a cruise mode of operation of the vehicle.

15. The vehicle of claim 1, wherein the plurality of operation modes includes a third mode corresponding to an expert mode of operation of the vehicle.

16. The vehicle of claim 1, wherein the plurality of operation modes includes a fourth mode corresponding to a normal mode of operation of the vehicle.

17. The vehicle of claim 1, wherein the at least one user input device includes a display configured to receive the input and transmit the input to the controller.

18. A method of operation of a vehicle comprising a plurality of ground engagement members and a power system operatively coupled to at least one of the plurality of ground engagement members to power movement of the vehicle, the method of operation of the vehicle comprising the steps of:

providing at least one memory during operation of the vehicle configured to store data for the power system;

providing at least one user input device and at least one vehicle sensor;

receiving sensor data from the at least one vehicle sensor, and storing the sensor data on the at least one memory;

controlling operation of the power system based on a security code input from the user input device to the controller when the security code matches a predetermined security code associated with one of a plurality of operation modes of the vehicle including at least a first mode defined by a first performance characteristic and a second mode defined by a second performance characteristic; and controlling operation of the power system in response to the security code not matching the predetermined security code based upon a characteristic of the power system and a time period.

19. The method of claim 18, further comprising storing, in the at least one memory, a first security code and a second security code being different from the first security code, wherein the first security code corresponds to the first mode, and the second security code corresponds to the second mode.

20. The method of claim 19, further comprising adjusting a performance characteristic of the vehicle based on one of the first and second security codes corresponding to one of the first and second modes.

21. The method of claim 18, further comprising comparing the security code input from the user input device with a plurality of predetermined security codes stored in the at least one memory, and initiating operation of the power system based on the security code.

22. The method of claim 21, further comprising relating each of the plurality of predetermined security codes stored in the at least one memory to at least one of the plurality of operation modes of the vehicle.

23. The method of claim 18, further comprising relating the first mode to a first vehicle speed threshold and relating the second mode to a second vehicle speed threshold greater than the first vehicle speed threshold.

24. The method of claim 18, further comprising adjusting, in the first mode, at least one of: a vehicle speed and an engine speed of the vehicle.

25. The method of claim 18, further comprising adjusting, in the second mode, at least one of: a fuel economy operation and an acceleration rate of at least one of a vehicle speed and an engine speed.

26. The method of claim 18, further comprising providing a novice mode of operation of the vehicle in the first mode.

27. The method of claim 18, further comprising providing a cruise mode of operation of the vehicle in the second mode.

28. The method of claim 18, further comprising including a third mode in the plurality of operation modes corresponding to an expert mode of operation of the vehicle.

29. The method of claim 18, further comprising including a fourth mode in the plurality of operation modes corresponding to a normal mode of operation of the vehicle.

30. The method of claim 18, further comprising providing a display as the at least one user input device configured to receive the input.

31. The method of claim 18, further comprising including a plurality of alphanumeric digits in the security code, and identifying the at least one operation mode based on at least a first of the plurality of alphanumeric digits.

32. The method of claim 18, further comprising including a plurality of alphanumeric digits in the security code, and identifying the at least one operation mode based on at least a last of the plurality of alphanumeric digits.

33. A method of operation of a vehicle comprising a plurality of ground engagement members and a power system operatively coupled to at least one of the plurality of ground engagement members to power movement of the vehicle, the method of operation of the vehicle comprising the steps of:
 starting the power system of the vehicle;
 monitoring a characteristic of the power system;
 in the absence of the vehicle receiving a predetermined input that matches a predetermined code after a predetermined time period,
  shutting down operation of the power system of the vehicle if the characteristic of the power system is at or above a threshold; and
  prompting a user to provide the predetermined input if the characteristic of the power system is below the threshold; and
 in response to the vehicle receiving the predetermined input that matches the predetermined code, permitting the operation of the power system.

34. The method of claim 33, wherein the characteristic of the power system is a characteristic of an engine.

35. The method of claim 34, wherein the characteristic of the power system is an engine temperature.

36. The method of claim 33, wherein the operation of the power system is an engine rpm.

37. The method of claim 33, wherein the operation of the power system is a speed of the vehicle.

38. The method of claim 33, wherein the operation of the power system is an acceleration of the vehicle.

39. The method of claim 18, wherein, after a predetermined time period has elapsed and the security code input from the user input device does not match the predetermined security code:
 shutting down the power system if a temperature of the power system is at or above a predetermined temperature threshold; and
 prompting a user to re-enter a security code if the temperature of the power system is below the predetermined temperature threshold.

40. The vehicle of claim 1, wherein the controller responds to the security code input from the user input device not matching the predetermined security code by shutting down the power system if a predetermined time period has elapsed and a temperature of the power system is at or above a predetermined temperature threshold; and wherein the controller responds to the security code input from the user input device not matching the predetermined security code by prompting a user to re-enter a security code if the predetermined time period has elapsed and the temperature of the power system is below the predetermined temperature threshold.

* * * * *